United States Patent
Lee et al.

(10) Patent No.: US 12,494,886 B2
(45) Date of Patent: Dec. 9, 2025

(54) METHOD AND APPARATUS FOR PROVIDING ULTRA WIDE BAND (UWB) COMMUNICATION

(71) Applicant: Samsung Electronics Co., Ltd., Suwon-si (KR)

(72) Inventors: Mingyu Lee, Suwon-si (KR); Taeyoung Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 719 days.

(21) Appl. No.: 17/849,009

(22) Filed: Jun. 24, 2022

(65) Prior Publication Data
US 2022/0416989 A1    Dec. 29, 2022

(30) Foreign Application Priority Data

Jun. 25, 2021 (KR) .......... 10-2021-0083438
Jul. 9, 2021 (KR) .......... 10-2021-0090449
Jan. 7, 2022 (KR) .......... 10-2022-0002948

(51) Int. Cl.
*H04W 4/00* (2018.01)
*H04L 5/00* (2006.01)
*H04W 28/02* (2009.01)
*H04W 28/20* (2009.01)
*H04W 48/10* (2009.01)

(52) U.S. Cl.
CPC ....... *H04L 5/0094* (2013.01); *H04W 28/0226* (2013.01); *H04W 28/20* (2013.01); *H04W 48/10* (2013.01)

(58) Field of Classification Search
None
See application file for complete search history.

(56) References Cited

U.S. PATENT DOCUMENTS

| 7,089,033 B2 | 8/2006 | Leinonen et al. | |
| 9,019,934 B2* | 4/2015 | Yun | H04W 88/06 370/465 |
| 11,082,809 B1* | 8/2021 | Burowski | H04W 8/005 |

(Continued)

FOREIGN PATENT DOCUMENTS

| KR | 10-2021-0003736 A | 1/2021 |
| WO | 2020/069311 A1 | 4/2020 |
| WO | 2024/151301 A1 | 7/2024 |

OTHER PUBLICATIONS

International Search report dated Sep. 27, 2022, issued in International Application No. PCT/KR2022/009051.

(Continued)

*Primary Examiner* — Bob A Phunkulh
(74) *Attorney, Agent, or Firm* — Jefferson IP Law, LLP

(57) ABSTRACT

A method for operating an ultra-wide band (UWB) channel and a narrow band (NB) channel together are provided. The method of a second UWB device includes receiving an advertisement message providing information on a UWB channel used by the first UWB device through an NB channel, and performing at least one operation for performing UWB ranging by using the UWB channel based on the advertisement message. The UWB channel may be one of candidate UWB channels allocated for UWB communication, and the NB channel may be a sub-channel of one of the candidate UWB channels.

20 Claims, 23 Drawing Sheets

(56) References Cited

U.S. PATENT DOCUMENTS

| | | | | |
|---|---|---|---|---|
| 2005/0255878 | A1* | 11/2005 | Leinonen | H04B 1/719 455/552.1 |
| 2006/0103533 | A1* | 5/2006 | Pahlavan | G06K 7/10306 340/572.1 |
| 2006/0188003 | A1* | 8/2006 | Larsson | H04B 1/719 375/130 |
| 2008/0291090 | A1* | 11/2008 | Vandenameele | G01S 13/767 342/387 |
| 2009/0285262 | A1* | 11/2009 | Kim | H01Q 9/145 343/904 |
| 2010/0246635 | A1* | 9/2010 | Ye | H04B 1/719 455/296 |
| 2010/0328043 | A1* | 12/2010 | Jantunen | G06K 7/0008 340/10.3 |
| 2011/0032138 | A1* | 2/2011 | Krapf | G01S 7/021 342/21 |
| 2011/0169607 | A1* | 7/2011 | Paulson | G01S 13/825 340/10.1 |
| 2014/0148196 | A1* | 5/2014 | Bassan-Eskenazi | H04W 4/029 455/456.1 |
| 2014/0152437 | A1* | 6/2014 | Tian | H04W 4/021 370/350 |
| 2015/0092753 | A1* | 4/2015 | Gupta | H04W 56/0035 370/336 |
| 2015/0094081 | A1* | 4/2015 | Gupta | H04W 64/003 455/456.1 |
| 2015/0362581 | A1* | 12/2015 | Friedman | H04W 4/80 455/456.1 |
| 2017/0264338 | A1 | 9/2017 | Yun et al. | |
| 2017/0359692 | A1 | 12/2017 | Kong et al. | |
| 2018/0183489 | A1* | 6/2018 | Rasmussen | H04L 1/0071 |
| 2018/0184422 | A1* | 6/2018 | Cavalcanti | H04W 72/0446 |
| 2019/0052445 | A1* | 2/2019 | Rantala | H04W 72/12 |
| 2019/0135229 | A1* | 5/2019 | Ledvina | H04W 12/50 |
| 2019/0208387 | A1* | 7/2019 | Jiang | H04W 4/46 |
| 2019/0379510 | A1* | 12/2019 | Gupta | H04L 5/0053 |
| 2020/0059952 | A1* | 2/2020 | Ly | H04W 72/542 |
| 2020/0106877 | A1* | 4/2020 | Ledvina | H04W 12/06 |
| 2020/0304970 | A1 | 9/2020 | Jiang et al. | |
| 2021/0006652 | A1 | 1/2021 | Ledvina et al. | |
| 2021/0014788 | A1 | 1/2021 | Sahin et al. | |
| 2021/0072373 | A1* | 3/2021 | Schoenberg | G01S 13/878 |
| 2021/0076163 | A1* | 3/2021 | Burowski | H04W 4/08 |
| 2021/0136556 | A1 | 5/2021 | Lee et al. | |
| 2021/0399761 | A1* | 12/2021 | Parthasarathi | H04B 7/0602 |
| 2022/0014875 | A1* | 1/2022 | Rybalko | H04W 4/029 |
| 2022/0066019 | A1* | 3/2022 | Waheed | G01S 13/84 |
| 2022/0078578 | A1* | 3/2022 | Brumley | G01S 13/767 |
| 2022/0272488 | A1* | 8/2022 | Pekhteryev | G01S 1/042 |
| 2022/0317235 | A1* | 10/2022 | Ye | G01S 5/12 |
| 2022/0377752 | A1* | 11/2022 | Zhbankov | G01S 5/0263 |
| 2023/0276212 | A1* | 8/2023 | Bansal | H04L 67/51 455/414.1 |

OTHER PUBLICATIONS

Written Opinion dated Sep. 27, 2022, issued in International Application No. PCT/KR2022/009051.

European Search Report dated Aug. 27, 2024, issued in European Application No. 22828830.4.

* cited by examiner (a)

(b)

(c)

METHOD AND APPARATUS FOR PROVIDING ULTRA WIDE BAND (UWB) COMMUNICATION

CROSS-REFERENCE TO RELATED APPLICATION(S)

This application is based on and claims priority under 35 U.S.C. § 119(a) of a Korean patent application number 10-2021-0083438, filed on Jun. 25, 2021, in the Korean Intellectual Property Office, of a Korean patent application number 10-2021-0090449, filed on Jul. 9, 2021, in the Korean Intellectual Property Office, and of a Korean patent application number 10-2022-0002948, filed on Jan. 7, 2022, in the Korean Intellectual Property Office, the disclosure of each of which is incorporated by reference herein in its entirety.

BACKGROUND

1. Field

The disclosure relates to an ultra-wide band (UWB) communication. More particularly, the disclosure relates to a method and apparatus for providing a UWB service through a UWB channel and a narrow band (NB) channel.

2. Description of Related Art

The Internet is evolving from a human-centered connection network in which humans create and consume information to an Internet of things (IoT) in which information is exchanged and processed between distributed components such as objects. Internet of everything (IoE) technology is also emerging and is a combination of a big data processing technology based on a connection to a cloud server and the IoT technology. To implement the IoT, technology elements such as sensing technology, wired/wireless communication and network infrastructure, service interface technology, and security technology are important. Recently, technologies such as a sensor network, machine to machine (M2M), and machine type communication (MTC) have been studied for connection between objects.

In the IoT environment, an intelligent Internet technology (IT) service that collects and analyzes data generated from connected objects and thus creates new values in human life may be provided. The IoT may find its applications in the fields of smart home, smart building, smart city, smart car or connected car, smart grid, healthcare, smart home appliance, advanced medical service, and so on through convergence and merging between the existing information technology and various industries.

As various services may be provided along with the development of wireless communication systems, a method of effectively providing these services does not exist in the prior art and therefore is required. For example, a ranging technique for measuring a distance between electronic devices by using UWB may be used.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for collision avoidance and efficient use of a UWB device.

Another aspect of the disclosure is to provide a method for a UWB device to perform advertising, device discovery and/or connection setup by using in-band instead of out-of-band (OOB), and a structure of a UWB device for the same.

Another aspect of the disclosure is to provide a method of operating an NB channel for advertising, device discovery and/or connection setup.

Another aspect of the disclosure is to provide a method for a UWB device to advertise information on UWB communication used by the UWB device through an NB channel.

Additional aspects will be set forth in part in the description which follows and, in part, will be apparent from the description, or may be learned by practice of the presented embodiments.

In accordance with an aspect of the disclosure, a method of a first UWB device is provided. The method includes generating an advertisement message providing information on a UWB channel used by the first UWB device and broadcasting the advertisement message through a narrow band (NB) channel, wherein the UWB channel is one of candidate UWB channels allocated for UWB communication, and wherein the NB channel is a sub-channel of one of the candidate UWB channels.

In accordance with another aspect of the disclosure, a method of a second UWB device is provided. The method includes receiving an advertisement message providing information on a UWB channel used by the first UWB device through a narrow band (NB) channel, and performing at least one operation for performing UWB ranging by using the UWB channel based on the advertisement message, wherein the UWB channel is one of candidate UWB channels allocated for UWB communication, and wherein the NB channel is a sub-channel of one of the candidate UWB channels.

Through the method of the disclosure, it is possible to provide collision avoidance and efficient use of UWB devices.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
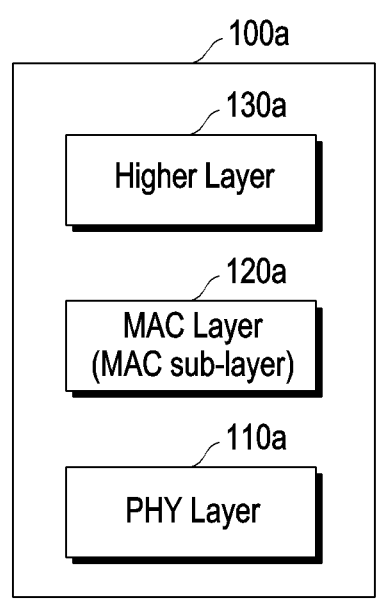
FIG. 1A is an architecture of a UWB device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, according to some embodiments, the "unit" may include one or more processors.

As used herein, the term "terminal" or "device" may be called a mobile station (MS), a user equipment (UE), a user terminal (UT), a wireless terminal, an access terminal (AT), a terminal, a subscriber unit (SU), a subscriber station (SS), a wireless device, a wireless communication device, a wireless transmit/receive unit (WTRU), a mobile node, a mobile, or any other term. Various example of the terminal may include a cellular phone, a smartphone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a music storage and reproduction home appliance having a wireless communication function, an Internet home appliance capable of wireless Internet access and browsing, and portable units or terminals having integrated combinations of the above functions. Further, the terminal may include a machine to machine (M2M) terminal, and a machine type communication (MTC) terminal/device, but is not limited thereto. In the specification, the terminal may also be simply called an electronic device or a device.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, embodiments of the disclosure will be described in detail in conjunction with the accompanying drawings. In the following description of embodiments of the disclosure, a communication system using UWB will be described by way of example, but the embodiments of the disclosure may be applied to other communication systems having similar technical backgrounds or characteristics. Examples of such communication systems may include communication systems Bluetooth or ZigBee. Therefore, based on determinations by those skilled in the art, the embodiments of the disclosure may be applied to other communication systems through some modifications without significantly departing from the scope of the disclosure.

In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In general, wireless sensor network technology is largely divided into wireless local area network (WLAN) technology and wireless personal area network (WPAN) technology depending on the recognition distance. In this case, the wireless LAN is a technology based on IEEE 802.11, and a technology that may access a backbone network within a radius of 100 m. In addition, the wireless private network is a technology based on IEEE 802.15, and includes Bluetooth, ZigBee, ultra-wide band (UWB), and the like. A wireless network in which such a wireless network technology is implemented may consist of a plurality of electronic devices.

According to the definition of the Federal Communications Commission (FCC), UWB may refer to a wireless communication technology that uses a bandwidth of 500 MHz or more, or a bandwidth corresponding to a center frequency of 20% or more. The UWB may refer to a band itself to which UWB communication is applied. The UWB enables secure and accurate ranging between devices. In this way, the UWB enables relative position estimation based on the distance between two devices or accurate position estimation of the device based on the distance from fixed devices (with known position).

The specific terms used in the following description are provided to help understanding of the disclosure, and the use of the specific terms may be changed to other forms without departing from the technical idea of the disclosure.

"Ranging Device" may be a device capable of performing UWB ranging. In the disclosure, the ranging device may be, for example, a ranging device (RDEV) or an enhanced ranging device (ERDEV) defined in IEEE 802.15.4/4z. In the disclosure, the ranging device may be referred to as a UWB device.

"Advertiser" may be a device (e.g., a ranging device) that transmits (or broadcasts) an advertisement message through an advertisement channel.

"Scanner" may be a device (e.g., a ranging device) that scans an advertisement channel and receives an advertisement message. In the disclosure, the scanner may be referred to as an observer.

"Controller" may be a device (e.g., a ranging device) that defines and controls a ranging control message (RCM) (or a control message). The controller may define and control ranging features by sending the control message.

"Controlee" may be a device (e.g., a ranging device) using a ranging parameter in the RCM (or a control message) received from the controller. The controlee may utilize the ranging features as configured via the control message from the controller.

"Initiator" may be a device (e.g., a ranging device) that initiates a ranging exchange. The initiator may initiate the ranging exchange by sending the first RFRAME (ranging initiation message).

"Responder" may be a device (e.g., a ranging device) responding to the initiator in a ranging exchange. The responder may respond to the ranging initiation message received from the initiator.

"In-Band" is an underlying wireless technology and may be a data communication that uses UWB.

"Out-Of-Band (OOB)" is an underlying wireless technology and may be data communication that does not use UWB.

"UWB Session" may be a period from the start of communication between the controller and the controlee through UWB to the stop of communication. In the UWB session, a ranging frame (RFRAME) may be transmitted, a data frame may be transmitted, or both the ranging frame and the data frame may be transmitted.

"UWB Session ID" may be an ID (e.g., a 32 bit integer) that identifies the UWB session, which is shared between the controller and the controlee.

"UWB Session Key" may be a key used to protect the UWB session. The UWB session key may be used to generate a scrambled timestamp sequence (STS). In the disclosure, the UWB session key may be a UWB ranging session key (URSK) and may be abbreviated as a session key.

"UWB Subsystem (UWBS)" may be a hardware component implementing UWB PHY and MAC specifications included in a UWB device. In this disclosure, the UWB PHY and MAC specifications may be, for example, PHY and MAC specifications defined in IEEE 802.15.4/4z. In this disclosure, UWBS may be referred to as a UWB component.

"UWB-enabled Application" may be an application for a service (UWB service). In the disclosure, the "UWB-enabled Application" may be abbreviated as an application or a UWB application.

"Service" may be an implementation of a use case that provides a service to an end-user. In the disclosure, the service may be referred to as a UWB service.

"Service Data" may be data defined by a service provider that needs to be delivered between two ranging devices to implement a service.

"Service Provider" may be an entity that defines and provides hardware and software required to provide a specific service to an end-user.

"STS" may be a ciphered sequence for increasing the integrity and accuracy of ranging measurement timestamps.

"Dynamic STS mode" may be an operation mode in which STS is not repeated during a ranging session unlike "Static STS". In this mode, the STS may be managed by the ranging device, and the ranging session key for generating the STS may be managed by the secure component.

"Static STS mode" is an operation mode in which STS is repeated during a session, and does not need to be managed by the secure component.

"Secure Channel" may be a data channel that prevents overhearing and tampering.

"Secure Component" may be, for example, an entity (e.g. secure element (SE) or trusted execution environment (TEE)) with a defined security level interfacing with UWBS for the purpose of providing RDS to UWBS when dynamic STS is used.

"Secure Ranging" may be ranging based on an STS generated through a strong ciphering operation.

"UWB channel" may be one of candidate UWB channels allocated for UWB communication. The candidate UWB channels allocated for the UWB communication may be channels allocated for the UWB communication defined in IEEE 802.15.4/4z. The UWB channels may be used for UWB ranging and/or transactions. For example, the UWB channel may be used for transmission and reception of a ranging frame (RFRAME) and/or transmission and reception of a data frame. As an embodiment, one or a plurality of UWB channels may be operated together.

"Narrow band (NB) channel" may be a channel having a narrower bandwidth than a UWB channel. As an embodiment, the NB channel may be a sub-channel of one of candidate UWB channels allocated for UWB communication, or a channel using a specific bandwidth of another available band (e.g., some of the ISM (industrial, scientific and medical) bands). The candidate UWB channels allocated for the UWB communication may be channels allocated for the UWB communication defined in IEEE 802.15.4/4z. The NB channel may be used for advertising, device discovery, and/or connection setup for additional parameter negotiation/authentication. For example, the NB channel may be used for transmitting and receiving an advertisement message, an additional advertising message, a connection request message, and/or a connection confirmation message. As an embodiment, one or a plurality of NB channels may be operated together. As an embodiment, the NB channel may be used for in-band communication, like the UWB channel.

In addition, in describing the disclosure, when it is determined that a detailed description of related known functions or configurations may unnecessarily obscure the subject matter of the disclosure, the detailed description thereof will be omitted.

Hereinafter, various embodiments of the disclosure will be described with reference to the accompanying drawings.

The disclosure provides a method for collision avoidance and efficient use of a UWB device.

The disclosure provides a method for performing advertising, device discovery and/or connection setup by using an in-band instead of using out-of-band (OOB), and a structure of a UWB device therefor. Accordingly, the entire operation for providing the UWB service may be performed through in-band communication. In this case, in addition to the UWB communication module, a complete UWB service may be provided even in a device without an additional OOB communication module such as a BLE communication module.

The disclosure provides a method of operating at least one sub-channel among channels allocated for UWB as an NB channel for advertising, device discovery, and/or connection setup. In the disclosure, the NB channel used for advertising, device discovery, and/or connection setup may be distinguished from the channel (UWB channel) used for UWB ranging and/or transaction.

The disclosure provides a method of transmitting information on UWB communication used by a UWB device as a controller through an NB channel.

The disclosure provides a method of setting transmission timing and/or transmission offset that allows an UWB device, which is a controller, to coexist with an existing UWB communication by scanning an advertising channel (NB channel), before starting UWB communication.

The disclosure provides a method of obtaining a transmission timing of a controller to participate by scanning an NB channel before a UWB device, which is a controlee, participates in UWB communication.

The disclosure provides a method of obtaining a transmission timing of a controller to participate by scanning an NB channel before a UWB device, which is a controlee, participates in UWB communication, and thereafter, provides a method of performing additional parameter negotiation and/or authentication through a sub advertising channel (NB channel).

FIG. 1A is an architecture of a UWB device according to an embodiment of the disclosure.

Referring to FIG. 1A, the UWB device 100a may include at least one PHY layer 110a, a MAC layer (MAC sub-layer) 120a and/or a higher layer 130a.

(1) PHY Layer

At least one PHY layer 110a may include a transceiver with a low-level control mechanism. In the disclosure, the transceiver may be referred to as an RF transceiver or a radio transceiver.

In an embodiment, the at least one PHY layer 110a may include a first transceiver supporting a UWB channel and a second transceiver supporting an NB channel having a narrower bandwidth than the UWB channel. In the disclosure, the first transceiver may be referred to as a UWB transceiver, and the second transceiver may be referred to as an NB transceiver.

In another embodiment, the at least one PHY layer 110a may include a transceiver (dual channel transceiver) supporting both the UWB channel and the NB channel.

In an embodiment, the PHY layer 110a may support at least one of the following functions.

Transceiver activation and deactivation functions (transceiver on/off functions)
    Energy detection function
    Channel selection function
    Clear channel assessment (CCA) function
    Synchronization function
    Low-level signaling function
    UWB ranging, positioning and localization function
    Spectrum resource management function
    Function to transmit/receive packets through physical medium (2) MAC Layer The MAC layer 120a provides an interface between the higher layer 130a and the PHY layer 120a.

In an embodiment, the MAC layer 120a may provide the following two services.

MAC data service: a service that enables transmission and reception of MAC protocol data unit (PDU) through the PHY
    MAC management service: a service interfacing to MAC-SAP (MAC sub-layer management entity (MLME)-service access point (SAP))

In an embodiment, the MAC layer 120a may support at least one of the following functions.

Device discovery and connection setup function
    Channel access function (access function for physical channel (e.g., NB channel/UWB channel))
    Synchronization function (e.g., synchronization of NB channel and UWB channel)
    Interference mitigation function based on energy detection
    Functions related to narrowband signaling
    Guaranteed timeslot (GTS) management function
    Frame delivery function
    UWB ranging function
    PHY parameter change notification function
    Security function (3) Higher Layer The higher layer 130a may include a network layer providing functions such as network configuration and message routing, and/or an application layer providing an intended function of the device.

In an embodiment, the application layer may be a UWB-enabled application layer for providing a UWB service.

Figure 1B:
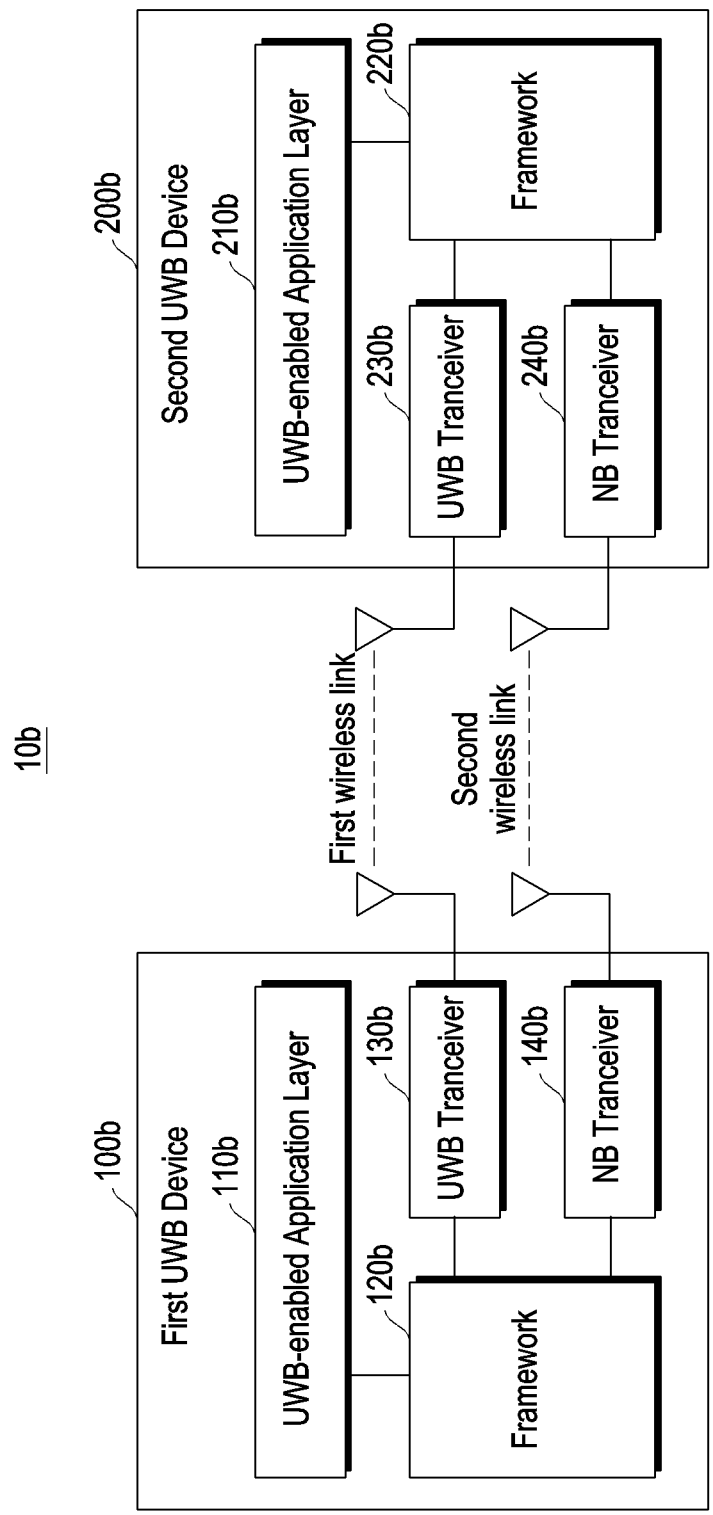
FIG. 1B illustrates a communication system including a UWB device according to an embodiment of the disclosure.

FIG. 1B illustrates a communication system including a UWB device according to an embodiment of the disclosure.

Referring to FIG. 1B, the communication system 10b may include a first UWB device 100b and a second UWB device 200b. The first UWB device 100b and/or the second UWB device 200b of FIG. 1B may be, for example, an example of the UWB device 100a of FIG. 1A.

The first UWB device 100b may include a UWB-enabled application layer 110b, a framework 120b, a UWB transceiver 130b, and/or an NB transceiver 140b. In addition, the second UWB device 200b may include a UWB-enabled application layer 210b, a framework 220b, a UWB transceiver 230b, and/or an NB transceiver 240b.

In FIG. 1B, the UWB transceiver and the NB transceiver of each device are illustrated as separate configurations, but the configuration is divided according to their operations/functions. This is not intended to limit that the UWB transceiver and the NB transceiver must be implemented in separate physical configurations (e.g., separate chipsets). Accordingly, the UWB transceiver and the NB transceiver may be implemented as separate chipsets, respectively, and the UWB transceiver and the NB transceiver may be implemented as one integrated chipset.

The UWB-enabled application layers 110b and 210b may be higher application layers for UWB services.

The frameworks 120b and 220b may be entities that integrate and manage the UWB transceivers 130b and 230b and the NB transceivers 140b and 240b. In an embodiment, the frameworks 120b and 220b may support a function of controlling UWB/NB communication (e.g., medium access control (MAC), UWB/NB transceiver synchronization) and/or a function of communicating the obtained information to higher application layers 110b and 210b.

The UWB transceivers 130b and 230b may support at least one of candidate UWB channels allocated for UWB communication. That is, the UWB transceivers 130b and 230b may support at least one UWB channel. An example of candidate UWB channels allocated for UWB communication may be shown in Table 1 below.

TABLE 1

| Band group$^a$ (decimal) | Channel number (decimal) | Center frequency, $f_c$ (MHz) | Band width (MHz) | Mandatory/ Optional |
|---|---|---|---|---|
| 0 | 0 | 499.2 | 499.2 | Mandatory below 1 GHz |
| 1 | 1 | 3494.4 | 499.2 | Optional |
|  | 2 | 3993.6 | 499.2 | Optional |
|  | 3 | 4492.8 | 499.2 | Mandatory in low band |
|  | 4 | 3993.6 | 1331.2 | Optional |
| 2 | 5 | 6489.6 | 499.2 | Optional |
|  | 6 | 6988.8 | 499.2 | Optional |
|  | 7 | 6489.6 | 1081.6 | Optional |
|  | 8 | 7488.0 | 499.2 | Optional |
|  | 9 | 7987.2 | 499.2 | Mandatory in high band |
|  | 10 | 8486.4 | 499.2 | Optional |

TABLE 1-continued

| Band group[a] (decimal) | Channel number (decimal) | Center frequency, $f_c$ (MHz) | Band width (MHz) | Mandatory/ Optional |
|---|---|---|---|---|
| | 11 | 7987.2 | 1331.2 | Optional |
| | 12 | 8985.6 | 499.2 | Optional |
| | 13 | 9484.8 | 499.2 | Optional |
| | 14 | 9984.0 | 499.2 | Optional |
| | 15 | 9484.8 | 1354.97 | Optional |

[a]Note that bands indicate a sequence of adjacent HRP UWB center frequencies: band 0 is the sub-gigahertz channel, band 1 has the low-band HRP UWB channels, and band 2 has the high-band channels.

In an embodiment, at least one of the channels in Table 1 may be allocated as a UWB channel supported by the UWB transceivers 130b and 230b. For example, channel numbers 5 and/or 9 in Table 1 may be allocated as UWB channels.

UWB transceivers 130b and 230b or at least one UWB channel supported by UWB transceivers 130b and 230b may be used for UWB ranging and/or transactions. For example, the UWB transceivers 130b and 230b or at least one UWB channel supported by the UWB transceivers 130b and 230b may be used for transmitting/receiving a ranging frame (RFRAME) and/or a data frame.

The NB transceivers 140b and 240b may support at least one NB channel having a narrower bandwidth (e.g., 50 MHz or less) than the UWB channel. The NB transceivers 140b and 240b or at least one NB channel supported by the NB transceivers 140b and 240b may be used for advertisement (discovery) and/or narrowband signaling.

In an embodiment, the NB channel may be a sub-channel of one of the candidate UWB channels allocated for UWB communication. An example of candidate UWB channels allocated for UWB communication may be as illustrated in Table 1 above.

In another embodiment, the NB channel may be a channel using a specific bandwidth of another available band (e.g., some of ISM (industrial, scientific and medical) bands, etc.).

As an embodiment, the NB channel may be used for in-band communication, like the UWB channel.

On the other hand, as illustrated in Table 1 above, the candidate UWB channels mainly have a bandwidth of 500 MHz or more. Accordingly, when this is used as it is for advertisement (discovery), it is disadvantageous for power spectral density (energy detection), so it is necessary to divide the corresponding channel into a plurality of sub-channels for advertisement (discovery).

For example, at least one of the sub-channels divided from one of the channels in Table 1 or at least one of the channels using a specific bandwidth of the available band (e.g., some of ISM (industrial, scientific and medical) bands, etc.) may be allocated as a channel for advertisement (advertisement channel). In an embodiment, the advertisement channel may be used to deliver an advertisement message. In the disclosure, the advertisement channel may be referred to as a first sub-channel, an NB advertisement channel, or a discovery channel, and the advertisement message may be referred to as a first advertisement message or an NB advertisement message.

In addition, at least one of the remaining sub-channel(s) or channel(s) not allocated as the advertisement channel may be allocated as a channel for connection setup (connection setup channel). In the disclosure, the channel for connection setup may be referred to as a second sub-channel, an NB connection setup channel, or a sub advertisement channel. On the other hand, in the disclosure, the advertisement channel and the connection setup channel may be collectively referred to as an NB channel.

In an embodiment, the connection setup channel may be used to deliver an additional advertisement message including additional advertising information not transmitted through the advertisement channel, for additional parameter negotiation, or for authentication. In the disclosure, the additional advertisement message may be referred to as a second advertisement message or an additional NB advertisement message.

As described above, the NB channel has a narrower bandwidth than the UWB channel. However, the band of the NB channel may be the same as or different from the band of the UWB channel.

For example, the NB channel and the UWB channel may use different bands. For example, the channel number of the candidate UWB channel including the sub-channel(s) allocated as the NB channel may be different from the channel number of the candidate UWB channel allocated as the UWB channel That is, one of the candidate UWB channels not allocated as the UWB channel may be allocated for the NB channel.

For another example, the NB channel and the UWB channel may use the same band. For example, the channel number of the candidate UWB channel including the sub-channel(s) allocated as the NB channel may be the same as the channel number of the candidate UWB channel allocated as the UWB channel. That is, one sub-channel(s) of the candidate UWB channels used as the UWB channel may be allocated for the NB channel.

In an embodiment, the first UWB device 100b and the second UWB device 200b may perform UWB communication (procedure) (in-band communication) through a first wireless link (UWB channel) configured through the UWB transceiver 130b of the first UWB device 100b and the UWB transceiver 230b of the second UWB device 200b.

In an embodiment, the first UWB device 100b and the second UWB device 200b may perform NB communication (procedure) (in-band communication) through a second wireless link (NB channel) configured through the NB transceiver 140b of the first UWB device 100b and the NB transceiver 240b of the second UWB device 200b.

Hereinafter, with reference to FIG. 2, a method for a UWB device to perform an NB communication (procedure) and a UWB communication (procedure) will be described.

Figure 2:
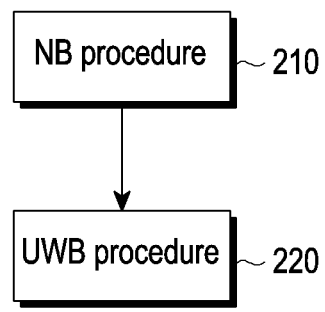
FIG. 2 illustrates a method for a UWB device to perform an NB procedure and a UWB procedure according to an embodiment of the disclosure.

FIG. 2 illustrates a method for a UWB device to perform an NB procedure and a UWB procedure according to an embodiment of the disclosure.

The UWB device of FIG. 2 may be, for example, the UWB device of FIG. 1A or 1B.

Referring to FIG. 2, the UWB device may perform an NB procedure 210 and a UWB procedure 220. The NB procedure 210 and the UWB procedure 220 may be managed or controlled by the MAC layer (entity) of the UWB device.

(1) NB Procedure (Step)

In the disclosure, the NB procedure 210 refers to a procedure performed by using at least one NB channel. The NB procedure 210 may be performed before the UWB procedure 220.

The NB procedure 210 may include at least one of the following operations.

An operation of the UWB device transmitting and/or receiving an NB advertisement message through at least one NB advertisement channel (advertising operation)

An operation of the UWB device transmitting and/or receiving an additional NB advertisement message, a connection request message, and/or a connection confirmation message through at least one NB connection setup channel (connection setup operation)

(2) UWB Procedure (Step)

In the disclosure, the UWB procedure 220 refers to a procedure performed by using at least one UWB channel.

The UWB procedure 220 may include at least one of the following operations.

An operation of the UWB device performing UWB ranging with another UWB device (UWB ranging operation)

An operation of the UWB device exchanging service data with another UWB device (transaction operation)

Hereinafter, with reference to FIG. 3A, embodiments of the NB procedure will be described.

Figure 3A:
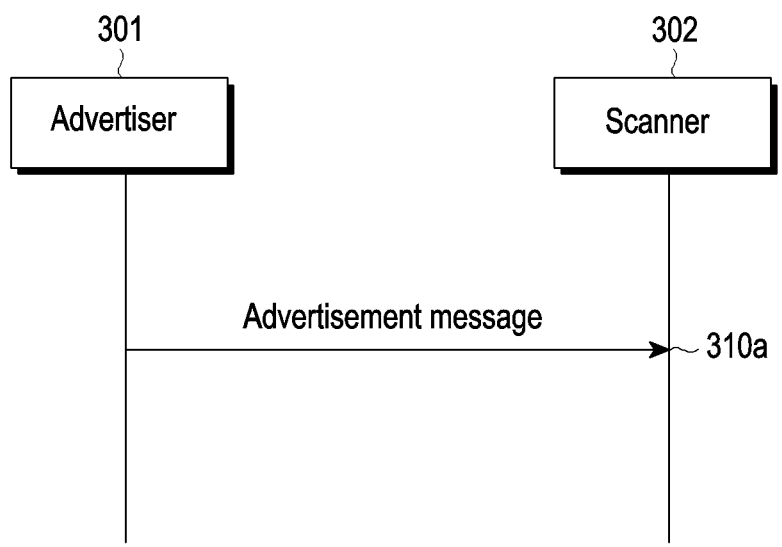
FIG. 3A illustrates an advertising operation according to an embodiment of the disclosure.

FIG. 3A illustrates an advertising operation according to an embodiment of the disclosure.

The advertising operation of FIG. 3A may be an example of the advertising operation of the NB procedure 210 of FIG. 2.

The advertising operation of FIG. 3A may be an advertising operation performed through the NB advertisement channel.

Referring to FIG. 3A, in operation 310a, an advertiser 301 may transmit an advertisement message. In an embodiment, the advertiser 301 may broadcast an NB advertisement message through at least one NB advertisement channel. In this case, a scanner 302 may scan at least one NB advertisement channel to receive the NB advertisement message. Through this, the scanner 302 may obtain device discovery and/or advertising information.

In an embodiment, the advertiser 301 may be a UWB device serving as an advertiser and a controller.

In an embodiment, the NB advertisement channel may be a channel that the advertiser 301 and the scanner 302 know in advance. For example, the NB advertisement channel may be included in the information provided when installing the related UWB-enabled application, may be a hard-coded default channel or a channel shared between the advertiser 301 and scanner 302 in various ways. As described above, the NB advertisement channel may be one sub-channel(s) of the candidate UWB channels.

In an embodiment, the NB advertisement message may include at least one of information on the start time point of a ranging round, information on a channel occupancy time (e.g., information on a channel occupancy time expressed as a multiple of a time unit (TU)), information on the length of a ranging block, information on the length of a ranging round, or information on the number or number of active rounds. Here, the active round may be a ranging round that is actually used (or occupied) during the ranging round.

In an embodiment, the NB advertisement message may include information (session ID information) on a session ID of the session (e.g., ranging session) and/or information (address information) on an address (e.g., the MAC address of the UWB device) of the UWB device transmitting the NB advertisement message. In an embodiment, the NB advertisement message may include numbering information for indicating which active round the NB Advertisement message corresponds to among all active rounds in the corresponding ranging block.

In an embodiment, the NB advertisement message may include information on the transmission time (transmission time information) of the corresponding subsequent NB advertisement message. For example, the NB advertisement message or transmission time information may include information (transmission slot indication information) indicating in which slot the transmission of the corresponding NB advertisement message starts to be transmitted and/or information on the length of the slot (slot length information).

In an embodiment, the NB advertisement message may include information on a period of a ranging block in which the NB advertisement message is transmitted. For example, information on the period of the NB Advertisement message or the ranging block may include information (first information) on how many ranging blocks are skipped or information (second information) on the number of consecutive ranging blocks in which the NB Advertising message is not transmitted.

In a case where the advertising information obtained through the operation of FIG. 3A includes all information necessary to perform UWB communication (UWB procedure), the scanner 302 may perform the UWB procedure immediately after performing the operation of FIG. 3A described above.

However, depending on the embodiment, the advertising information may include only a part of information necessary to perform the UWB procedure. That is, additional advertising information may be further required to perform UWB communication. Alternatively, additional parameter negotiation or authentication may be further required to perform UWB communication. In this case, an additional advertising operation and/or a connection setup operation may be further performed for obtaining additional advertising information, negotiation of additional parameters, and/or authentication. This will be described below with reference to FIG. 3B.

Figure 3B:
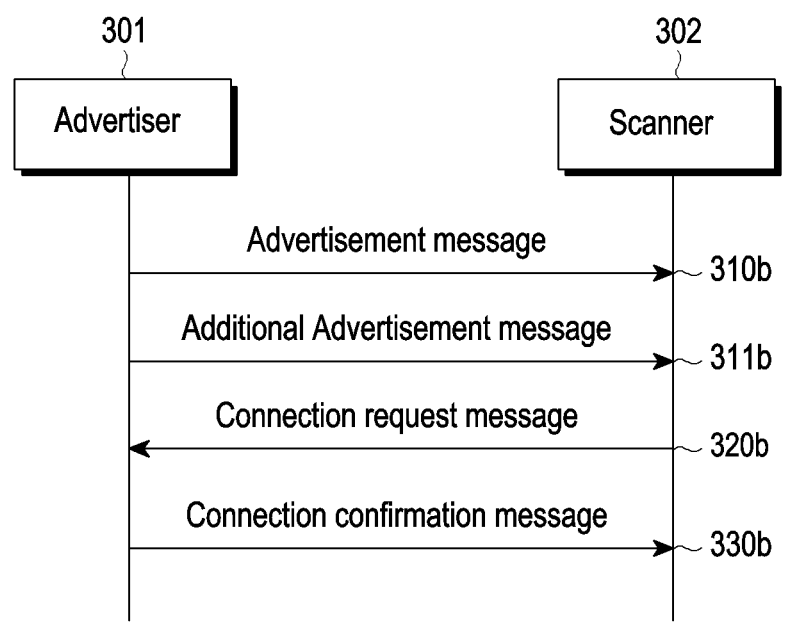
FIG. 3B illustrates an advertising operation and a connection setup operation according to an embodiment of the disclosure.

FIG. 3B illustrates an advertising operation and a connection setup operation according to an embodiment of the disclosure.

The advertising operation and connection setup operation of FIG. 3B may be an example of the advertising operation and connection setup operation of the NB procedure of FIG. 2.

The advertising operation of FIG. 3B may be an advertising operation performed through at least one NB advertisement channel, and the connection setup operation may be a connection setup operation performed through at least one NB connection setup channel.

Referring to FIG. 3B, in operation 310b, an advertiser 301 may transmit an advertisement message. For example, the advertiser 301 may broadcast an NB advertisement message through at least one NB advertisement channel. In this case, a scanner 302 may scan at least one NB advertisement channel to receive the NB advertisement message. Through this, the scanner 302 may obtain device discovery and/or advertising information.

In an embodiment, the advertiser 301 may be a UWB device serving as an advertiser and a controller.

As described above, the NB advertisement channel may be a channel that the advertiser 301 and the scanner 302 know in advance. In addition, the NB advertisement channel may be one sub-channel(s) of the candidate UWB channels.

In addition, in a case where additional advertising information is further required, the following operation 311b may be further performed. Operation 311b may be an optional operation.

In operation 311b, the advertiser 301 may transmit an additional advertisement message. For example, the advertiser 301 may broadcast an additional NB advertisement message through the NB connection setup channel. In this case, the scanner 302 may scan the NB connection setup channel to receive the additional NB advertisement message. In an embodiment, information on the NB connection setup channel may be included in the advertisement message of operation 310b.

Through the additional advertising operation of operation 311b, the scanner 302 may further obtain additional advertising information.

In addition, in a case where additional parameter negotiation and/or authentication (connection setup) is required, the following operations 320b and 330b may be further performed. Operations 320b and 330b may be optional operations.

In operation 320b, the scanner 302 may transmit a connection request message to the advertiser. For example, the scanner 302 may transmit the connection request message to the Advertiser through the NB connection setup channel. In an embodiment, the connection request message may include parameter(s) for the performance of the controlee and/or information for authentication.

In operation 330b, the advertiser 301 may transmit a connection confirmation message to the scanner in response to the connection request message. For example, the advertiser 301 may transmit the connection confirmation message to the scanner through the NB connection setup channel. In an embodiment, the connection confirmation message may include parameter(s) for UWB setup, parameter(s) for a session key for protecting a UWB session, and/or information for authentication.

Through the connection setup operation of operations 320b and 330b, negotiation and/or authentication of additional parameters may be performed.

On the other hand, the message exchange operations of operations 320b and 330b may be repeatedly performed as many times as necessary. For example, in a case where additional message exchange is required (i.e. in a case where message exchange is required for additional parameter negotiation and/or authentication) after performing the message exchange of operations 320b and 330b once, the message exchange operations of operations 320b and 330b may be further performed as many as necessary in the corresponding NB connection setup channel (sub advertisement channel).

Compared to the embodiment of FIG. 3A, the embodiment of FIG. 3B may reduce the congestion level of the NB advertisement channel (discovery channel) and allows a plurality of NB channels to be efficiently operated. On the other hand, compared to the embodiment of FIG. 3B, the embodiment of FIG. 3A may perform a faster NB procedure, thereby reducing the time for providing the entire UWB service. Accordingly, it is necessary to flexibly configure an appropriate NB procedure and NB channel operation method considering the number of UWB devices participating in UWB ranging, the surrounding environment, and the like.

Hereinafter, with reference to FIG. 4A, embodiments of the UWB ranging operation of the UWB procedure will be described.

Figure 4A:
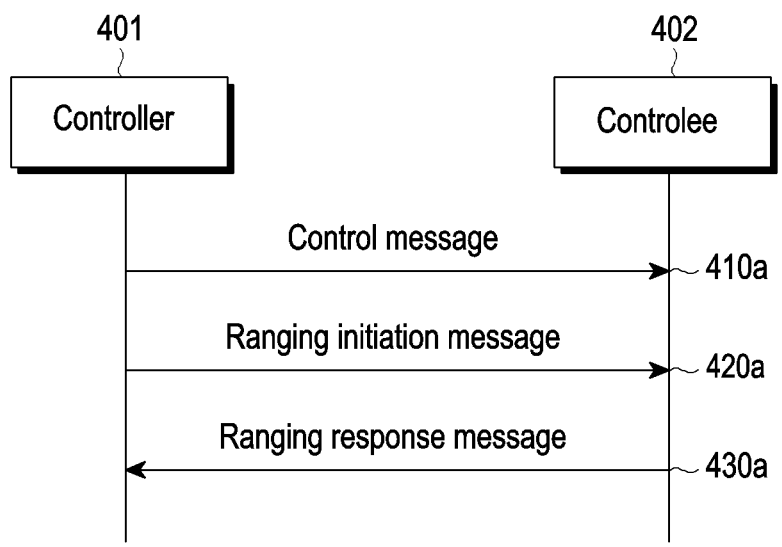
FIG. 4A illustrates a UWB ranging operation according to an embodiment of the disclosure.

FIG. 4A illustrates a UWB ranging operation according to an embodiment of the disclosure.

The UWB ranging operation of FIG. 4A may be an example of the UWB ranging operation of the UWB procedure of FIG. 2. The UWB ranging operation of FIG. 4A may be performed through a UWB channel.

In the embodiment of FIG. 4A, UWB ranging may be, for example, single-sided two-way ranging (SS-TWR) or double-sided two-way ranging (DS-TWR).

In the embodiment of FIG. 4A, it is assumed that the controller 401 performs the role of the initiator and the controlee 402 performs the role of the responder.

Referring to FIG. 4A, operation 410a, the controller 401 may transmit a control message (ranging control message) for controlling UWB ranging to the controlee 402. For example, the controller 401 may transmit the control message to the controlee 402 through a UWB channel.

In an embodiment, the control message may include information on the role (e.g., initiator or responder) of the UWB device, ranging slot index information, and/or address information of the UWB device.

Referring to operation 420a, the controller 401 may transmit a ranging initiation message for starting ranging exchange to the controlee 402. For example, the controller 401 may transmit the ranging initiation message to the controlee 402 through a UWB channel.

Referring to operation 430a, the controlee 402 may transmit a ranging response message corresponding to the ranging initiation message to the controller 401. For example, the controlee 402 may transmit the ranging response message to the controller 401 through a UWB channel.

In an embodiment, the ranging response message may further include first measurement report information. The first measurement report information may include, for example, an AoA measurement, a reply time measured by a responder, and/or a list of round-trip time measurements for responder addresses and responders. Here, the reply time may indicate a time difference between the reception time of the ranging initiation message and the transmission time of the ranging response message at the responder side. Based on this, single-sided two-way ranging (SS-TWR) may be performed. Calculation of time-of-flight (ToF) and distance/direction/position through SS-TWR follows the method defined in IEEE 802.15.4z.

On the other hand, in the case of the DS-TWR, the controller (initiator) 401 may further transmit a ranging final message (ranging response message) for completing ranging to the controlee (responder) 402. For example, the controller (initiator) 401 may further transmit the ranging final message to the controlee (responder) 402 through the UWB channel.

In an embodiment, the ranging final message may further include second measurement report information. The second measurement report information may include an AoA measurement, a list of round-trip time (first round-trip time) for the first responder and/or reply time measurements for responder addresses and responders. Here, the first round-trip time may indicate a time difference between the ranging response message from the responder and the ranging final message from the initiator. Based on this, double-sided two-way ranging (DS-TWR) may be performed. Calculation of time-of-flight (ToF) and distance/direction/position through DS-TWR follows the method defined in IEEE 802.15.4z.

Figure 4B:
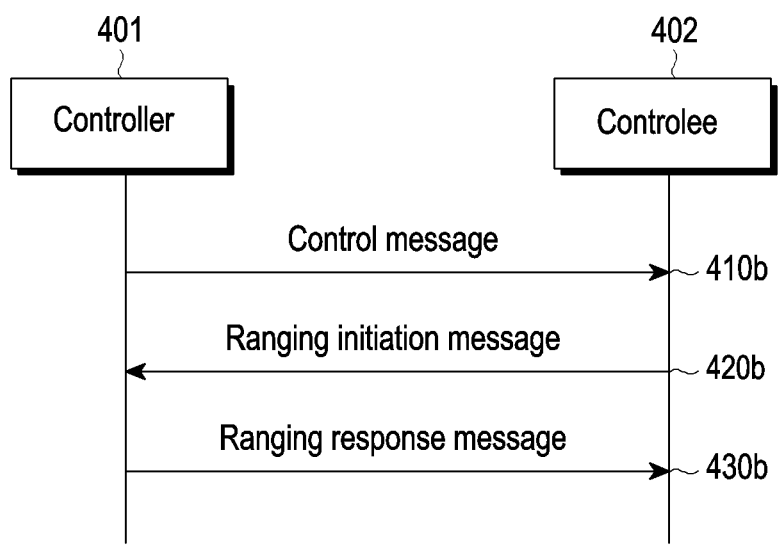
FIG. 4B illustrates a UWB ranging operation according to an embodiment of the disclosure.

FIG. 4B illustrates a UWB ranging operation according to an embodiment of the disclosure.

The UWB ranging operation of FIG. 4B may be an example of the UWB ranging operation of the UWB procedure of FIG. 2. The UWB ranging operation of FIG. 4B may be performed through a UWB channel.

In the embodiment of FIG. 4B, UWB ranging may be, for example, single-sided two-way ranging (SS-TWR) or double-sided two-way ranging (DS-TWR).

In the embodiment of FIG. 4B, unlike the embodiment of FIG. 4A, it is assumed that the controller 401 performs the role of the responder and the controlee 402 performs the role of the initiator.

Referring to FIG. 4B, operation 410b, the controller 401 may transmit a control message (ranging control message)

for controlling UWB ranging to the controlee 402. For example, the controller 401 may transmit the control message to the controlee 402 through a UWB channel.

In an embodiment, the control message may include information on the role (e.g., initiator or responder) of the UWB device, ranging slot index information, and/or address information of the UWB device.

Referring to operation 420*b*, the controlee (initiator) 402 may transmit a ranging initiation message for starting ranging exchange to the controller (responder) 401. For example, the controlee (initiator) 402 may transmit the ranging initiation message to the controller (responder) 401 through a UWB channel.

Referring to operation 430*b*, the controller (responder) 401 may transmit a ranging response message corresponding to the ranging initiation message to the controlee (initiator) 402. For example, the controller (responder) 401 may transmit the ranging response message to the controlee (initiator) 402 through a UWB channel.

In an embodiment, the ranging response message may further include first measurement report information. The first measurement report information may include, for example, an AoA measurement, a reply time measured by a responder, and/or a list of round-trip time measurements for responder addresses and responders. Here, the reply time may indicate a time difference between the reception time of the ranging initiation message and the transmission time of the ranging response message at the responder side. Based on this, single-sided two-way ranging (SS-TWR) may be performed. Calculation of time-of-flight (ToF) and distance/direction/position through SS-TWR follows the method defined in IEEE 802.15.4z.

On the other hand, in the case of the DS-TWR, the controlee (initiator) 402 may further transmit a ranging final message (ranging response message) for completing ranging to the controller (responder) 401. For example, the controlee (initiator) 402 may further transmit the ranging final message to the controller (responder) 401 through the UWB channel.

In an embodiment, the ranging final message may further include second measurement report information. The second measurement report information may include an AoA measurement, a list of round-trip time (first round-trip time) for the first responder and/or reply time measurements for responder addresses and responders. Here, the first round-trip time may indicate a time difference between the ranging response message from the responder and the ranging final message from the initiator. Based on this, double-sided two-way ranging (DS-TWR) may be performed. Calculation of time-of-flight (ToF) and distance/direction/position through DS-TWR follows the method defined in IEEE 802.15.4z.

Figure 5:
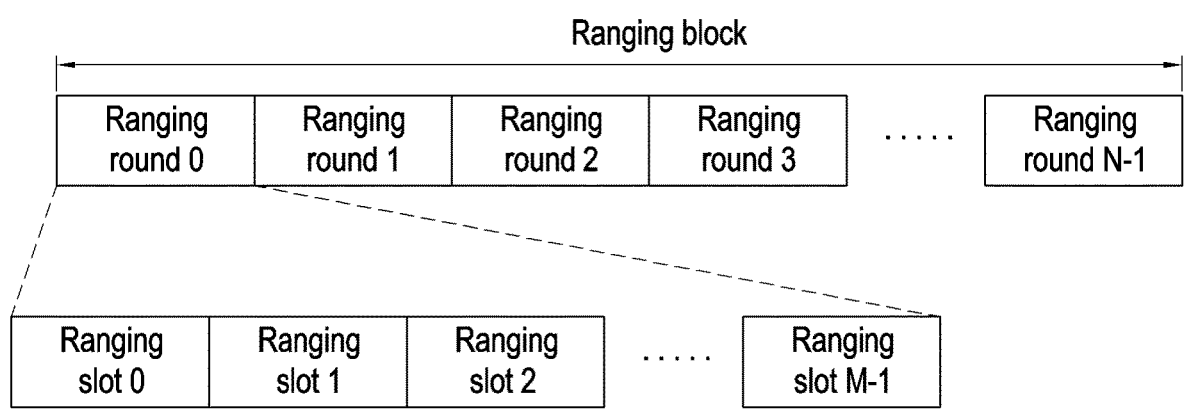
FIG. 5 illustrates an example of a structure of a ranging block and ranging rounds used for UWB ranging according to an embodiment of the disclosure.

FIG. 5 illustrates an example of a structure of a ranging block and ranging rounds used for UWB ranging according to an embodiment of the disclosure.

In the disclosure, a ranging block refers to a time period for ranging. A ranging round may be a period of sufficient duration to complete one entire range-measurement cycle in which a set of UWB devices participating in the ranging exchange is involved. A ranging slot may be a period of sufficient duration for transmitting at least one ranging frame RFRAME (e.g., ranging initiation/response/final message, etc.).

Referring to FIG. 5, one ranging block may include at least one ranging round, and each ranging round may include at least one ranging slot.

On the other hand, in a case where the ranging mode is a block-based mode, a mean time between consecutive ranging rounds may be constant. Alternatively, in a case where the ranging mode is an interval-based mode, the time between consecutive ranging rounds may be dynamically changed. That is, the interval-based mode may adopt a time structure having adaptive spacing.

The number and duration of slots included in a ranging round may be changed between ranging rounds. This may be set through a control message of the controller.

In the disclosure, a ranging block may be abbreviated as a block, a ranging round may be abbreviated as a round, and a ranging slot may be abbreviated as a slot.

Figure 6A:
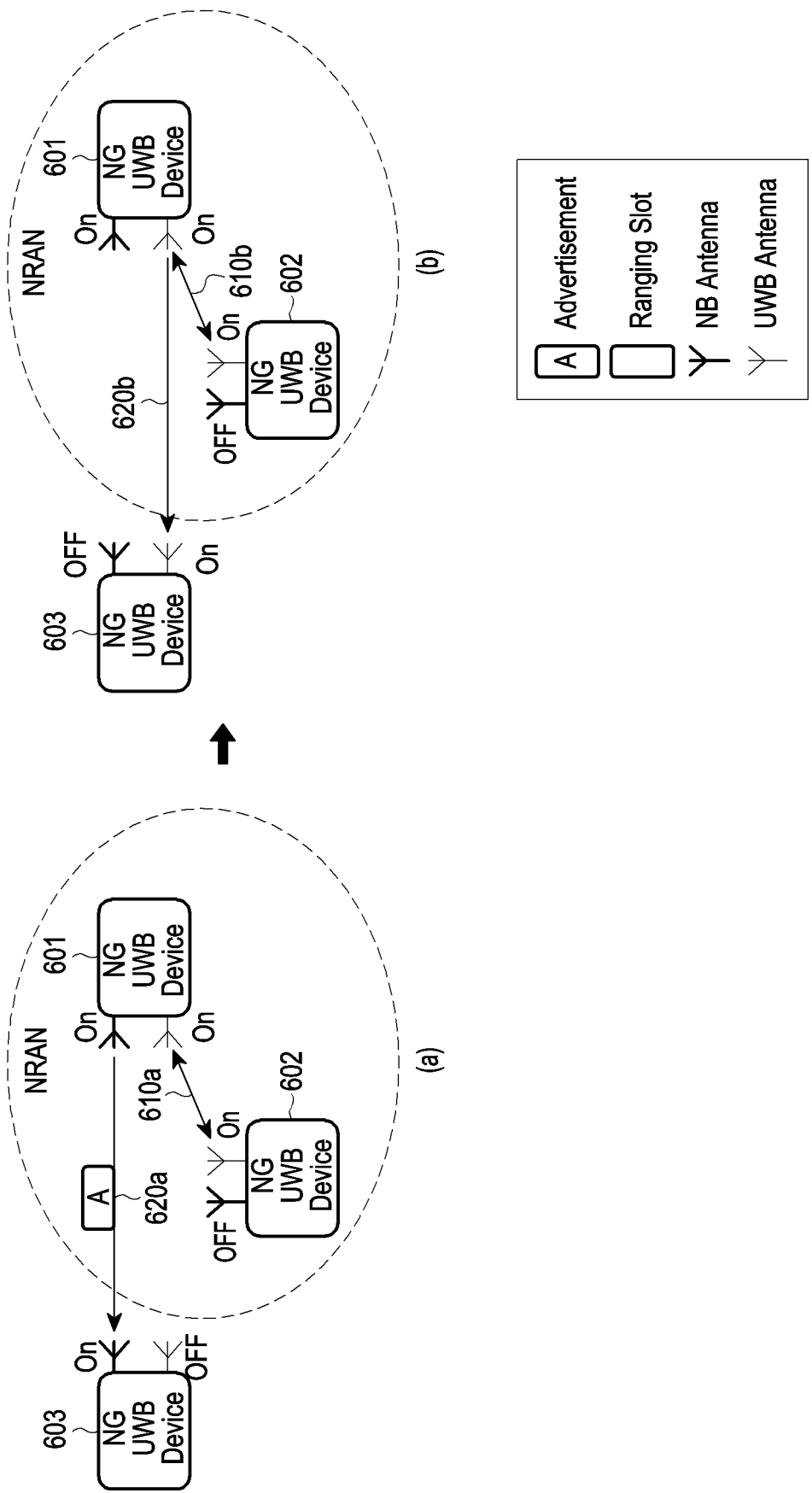
FIG. 6A illustrates a configuration of a ranging area network according to an embodiment of the disclosure.

FIG. 6A illustrates a configuration of a ranging area network according to an embodiment of the disclosure.

In the disclosure, a ranging area network (RAN) may be a network including an area in which UWB devices perform UWB ranging. In the disclosure, the ranging area network may be referred to as a new generation (NG) ranging area network (NRAN), and the UWB device may be referred to as an NG UWB device.

In an embodiment of FIG. 6A, it is assumed that the first UWB device 601 of the NRAN performs the role of a controller and an advertiser. In the NRAN of the embodiment of FIG. 6A, the first UWB device 601 may perform an NB procedure, and may also perform a UWB procedure with the second UWB device 602 through a UWB session already configured by the first UWB device 601. Each procedure will be described below.

(1) NB Procedure

Referring to part (a) of FIG. 6A, in operation 610*a*, the first UWB device 601 may perform a UWB ranging operation with the second UWB device 602 through an already configured UWB session. In an embodiment, the first UWB device 601 and the second UWB device 602 may perform a UWB ranging operation through the UWB antenna of each device. The UWB antenna of each device may be connected to a UWB transceiver of each device, and the UWB transceiver may support at least one UWB channel.

In operation 620*a*, the first UWB device 601 may transmit an advertisement message, and a third UWB device 603 may receive the advertisement message. In an embodiment, the first UWB device 601 may broadcast an NB advertisement message through the NB antenna of the first UWB device 601, and the third UWB device 603 may receive the NB advertisement message through the NB antenna of the third UWB device 603. The NB antenna of each device may be connected to a NB transceiver of each device, and the NB transceiver may support at least one NB channel.

In an embodiment of part (a) of FIG. 6A, the first UWB device 601 maintains an NB transceiver (or NB antenna) in an active state (on) to transmit an advertisement message, and maintains a UWB transceiver (or UWB antenna) in an active state (on) to perform UWB ranging. In addition, the second UWB device 602 maintains the UWB transceiver (or UWB antenna) in an active state (on) to perform UWB ranging, but may maintain the NB transceiver (or NB antenna) in an inactive state (off) because reception of the advertisement message is unnecessary. In addition, the third UWB device 603 maintains the UWB transceiver (or UWB antenna) in an active state (on) to receive the advertisement message, but may maintain the UWB transceiver (or UWB antenna) in an inactive state (off) because the third UWB device 603 has not yet performed UWB ranging.

As such, power saving is possible by turning on/off the UWB transceiver (or UWB antenna) and/or the NB transceiver (or NB antenna) according to the situation.

(2) UWB Procedure

Referring to part (b) of FIG. 6A, in operation 610b, the first UWB device 601 may perform a UWB ranging operation with the second UWB device 602 through an already configured UWB session. In an embodiment, the first UWB device 601 and the second UWB device 602 may perform a UWB ranging operation through the UWB antenna of each device. As described above, the UWB antenna of each device may be connected to a UWB transceiver of each device, and the UWB transceiver may support at least one UWB channel.

In operation 620b, the first UWB device 601 may perform a UWB ranging operation with the third UWB device 603. In an embodiment, in a case where the third UWB device 603 obtains information necessary to participate in UWB ranging (UWB procedure) with the first UWB device 601 through operation 620a, the third UWB device 603 may perform UWB ranging with the first UWB device 601. To this end, the third UWB device 603 may switch the UWB transceiver (or UWB antenna) of the third UWB device 603 to an active state (on). Thereafter, the third UWB device 603 may receive the ranging control message from the first UWB device 601 through the UWB antenna, and may perform a UWB ranging operation based on the ranging control message. As described above, the UWB antenna may be connected to a UWB transceiver, and the UWB transceiver may support at least one UWB channel.

On the other hand, in a case where the third UWB device 603 performs UWB ranging with the first UWB device 601, the third UWB device 603 may switch the NB transceiver (or NB antenna) of the third UWB device 603 to an inactive state (off) to save power.

In an embodiment of part (b) of FIG. 6A, the first UWB device 601 maintains an NB transceiver (or NB antenna) in an active state (on) to transmit an advertisement message, and maintains a UWB transceiver (or UWB antenna) in an active state (on) to perform UWB ranging. In addition, the second UWB device 602 maintains the UWB transceiver (or UWB antenna) in an active state (on) to perform UWB ranging, but may maintain the NB transceiver (or NB antenna) in an inactive state (off) because reception of the advertisement message is unnecessary. In addition, the third UWB device 603 also maintains the UWB transceiver (or UWB antenna) in an active state (on) to perform UWB raging, but may maintain the NB transceiver (or NB antenna) in an inactive state (off) because reception of the advertisement message is unnecessary.

As such, power saving is possible by turning on/off the UWB transceiver (or UWB antenna) and/or the NB transceiver (or NB antenna) according to the situation.

On the other hand, in an embodiment of FIG. 6A, it is assumed that the third UWB device 603 serves as a scanner and a controlee, but the embodiments are not limited thereto. The third UWB device 603 may serve as a scanner and a controller. In this case, the third UWB device 603 may perform UWB ranging by configuring its own UWB session without participating in a UWB session controlled by another device.

Figure 6B:
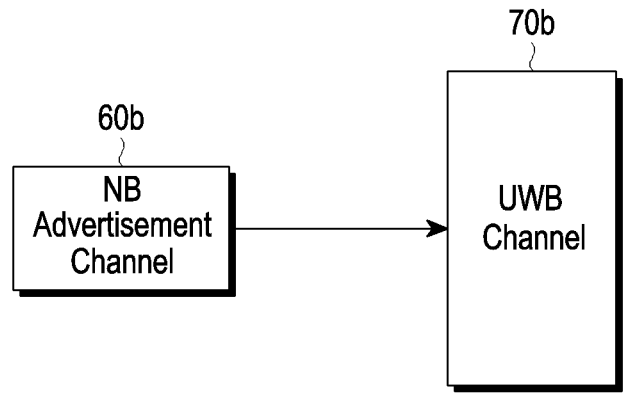
FIG. 6B illustrates a method of allocating an NB advertising channel to a UWB channel according to an embodiment of the disclosure.

FIG. 6B illustrates a method of allocating an NB advertising channel to a UWB channel according to an embodiment of the disclosure.

In an embodiment of FIG. 6B, it is assumed that one UWB channel is used.

Referring to FIG. 6B, an NB advertising channel 60b may be allocated to a UWB channel 70b to be used.

As an embodiment, the UWB channel 70b may be one of the candidate UWB channels (e.g., channel 5 or 9) of Table 1, and the NB channel 60b may be a sub-channel of the candidate UWB channel (e.g., channel 7) of Table 1.

As an embodiment, the UWB channel 70b and the NB advertisement channel 60b may be synchronized. The synchronization of the NB channel and the UWB channel may be referred to the following description, for example, the description of embodiments of FIGS. 7 to 14.

As an embodiment, the UWB device serving as the advertiser may transmit an advertising message (packet) for the UWB channel 70b through the NB advertising channel 60b allocated for the UWB channel 70b, and the UWB device serving as a scanner may receive an advertising message (packet) for the UWB channel 70b through the NB advertising channel 60b.

As an embodiment, the UWB device (scanner) may scan the NB advertisement channel 60b based on a predetermined scan interval and scan window.

On the other hand, according to an embodiment, a plurality of UWB channels may be used. Hereinafter, embodiments of a method of allocating an NB advertisement channel to a plurality of UWB channels will be described with reference to FIGS. 6C and 6D.

Figure 6C:
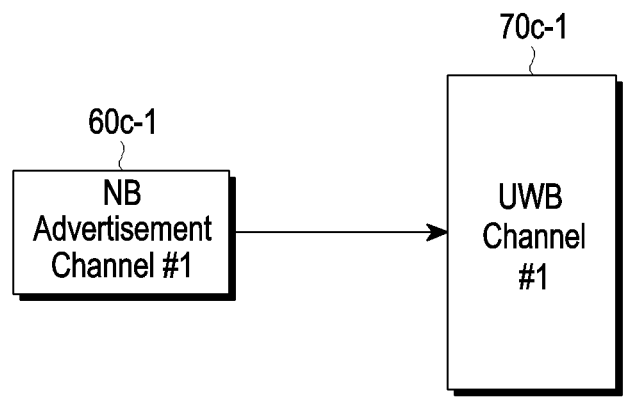
FIG. 6C illustrates a method of allocating NB advertising channels to a plurality of UWB channels according to an embodiment of the disclosure.
Figure 6C:
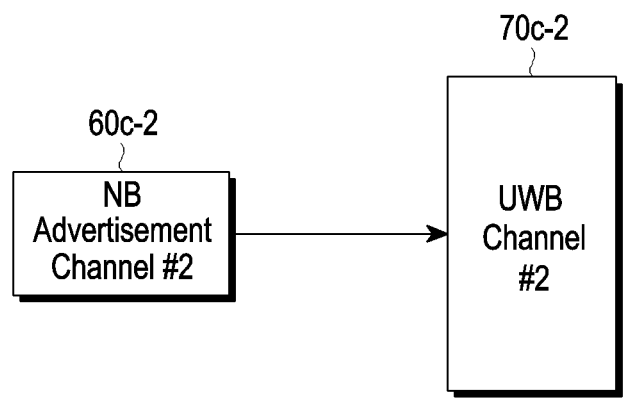

FIG. 6C illustrates a method of allocating NB advertising channels to a plurality of UWB channels according to an embodiment of the disclosure.

Referring to FIG. 6C, it is assumed that two UWB channels (e.g., channels 5 or 9) are used, but the embodiment is not limited thereto. For example, even when three or more UWB channels are used, the description to be described later may be applied.

In an embodiment of FIG. 6C, separate NB advertising channel 60c-1 and 60c-2 may be allocated to each UWB channel 70c-1 and 70c-2 to be used. For example, as illustrated, the first NB advertisement channel 60c-1 may be allocated for use of the first UWB channel 70c-1, and the second NB advertisement channel 60c-2 may be allocated for use of the second UWB channel 70c-2.

As an embodiment, the first UWB channel 70c-1 may be one of the candidate UWB channels (e.g., channel 5) of Table 1, and the first NB channel 60c-1 may be a sub-channel of the candidate UWB channel of Table 1. In addition, the second UWB channel 70c-2 may be one of the candidate UWB channels (e.g., channel 9) of Table 1, and the second NB channel 60c-2 may be a sub-channel of the candidate UWB channel of Table 1. As an embodiment, the first NB channel 60c-1 and the second NB channel 60c-2 may be different sub-channels of the same candidate UWB channel (e.g., channel 7) of Table 1 or may be sub-channels of a different candidate UWB channel (e.g., channels 7 and 11) of Table 1.

As an embodiment, each of the NB advertisement channels 60c-1 and 60c-2 may be synchronized with the corresponding UWB channels 70c-1 and 70c-2. For example, the first NB advertisement channel 60c-1 may be synchronized with the first UWB channel 70c-1, and the second NB advertisement channel 60c-2 may be synchronized with the second UWB channel 70c-2. The synchronization of the NB channel and the UWB channel may be referred to the following description, for example, the description of embodiments of FIGS. 7 to 14.

As an embodiment, the UWB device serving as the advertiser may transmit a first advertisement message (packet) for the first UWB channel 70c-1 through the first NB advertisement channel 60c-1 allocated for the first UWB channel 70c-1, and the UWB device serving as a scanner may receive a first advertisement message (packet) for the first UWB channel 70c-1 through the first NB advertisement channel 60c-1. In addition, the UWB device serving as the advertiser may transmit a second advertisement message (packet) for the second UWB channel 70c-2 through the second NB advertisement channel 60c-2 allocated for the second UWB channel 70c-2, and the UWB device serving as a scanner may receive a second advertisement message (packet) for the second UWB channel 70c-2 through the second NB advertisement channel 60c-2.

As an embodiment, the UWB device (scanner) may scan the first NB advertisement channel 60c-1 and the second NB advertisement channel 60c-2 based on a predetermined scan interval and scan window. As an embodiment, the UWB device (scanner) may scan the first NB advertisement channel 60c-1 and the second NB advertisement 60c-2 simultaneously or alternately.

As an embodiment, the advertisement message transmitted through each advertisement channel 60c-1 and 60c-2 may include information for indicating use of the corresponding UWB channels 70c-1 and 70c-2. For example, the first advertisement message of the first NB advertisement channel 60c-1 may include channel number information of the first UWB channel 70c-1 to be used, and the advertisement message of the second NB advertisement channel 60c-2 may include channel number information of the second UWB channel 70c-2 to be used.

In the case of an embodiment of FIG. 6C, the UWB device may operate an NB advertisement channel allocated for each UWB channel, thereby quickly obtaining advertising information on the corresponding UWB channel compared to an embodiment of 6d to be described later.

Figure 6D:
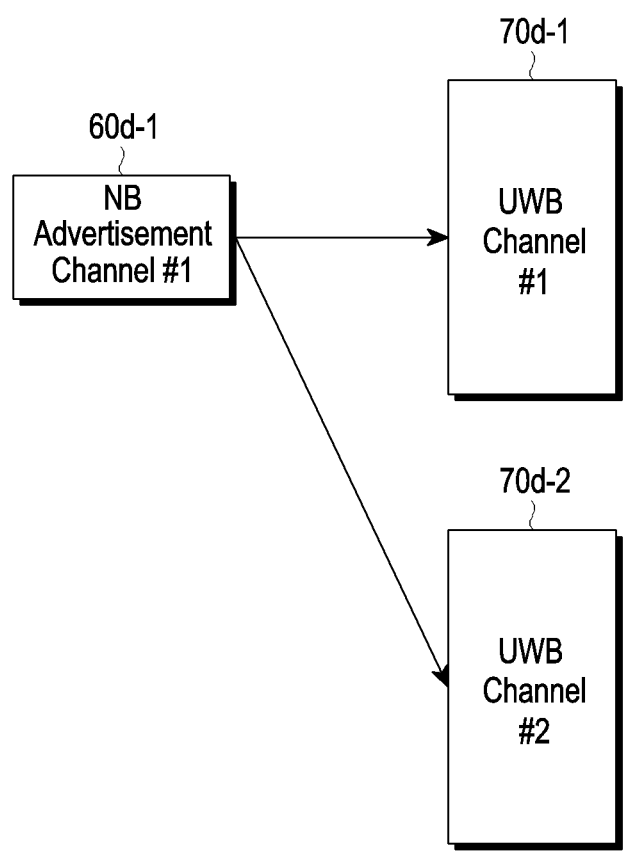
FIG. 6D illustrates a method of allocating NB advertising channels to a plurality of UWB channels according to an embodiment of the disclosure.

FIG. 6D illustrates a method of allocating NB advertising channels to a plurality of UWB channels according to an embodiment of the disclosure.

Referring to FIG. 6D, it is assumed that two UWB channels (e.g., channels 5 or 9) are used, but the embodiment is not limited thereto. For example, even when three or more UWB channels are used, the description to be described later may be applied.

In an embodiment of FIG. 6D, unlike the embodiment of FIG. 6C, one NB advertisement channel 60d-1 for a plurality of UWB channels 70d-1 and 70d-2 may be allocated. For example, as illustrated, a single first NB Advertisement channel 60d-1 may be allocated for use of the first UWB channel 70d-1 and the second UWB channel 70d-1.

As an embodiment, the method of allocating a single NB advertisement channel for a plurality of UWB channels such as FIG. 6D may be applied, for example, when a multiple access scheme such as a direct sequence spread spectrum (DSSS) is used.

As an embodiment, the first UWB channel 70d-1 may be one of the candidate UWB channels (e.g., channel 5) of Table 1, the second UWB channel 70d-2 may be one of the candidate UWB channels (e.g., channel 9) of Table 1, and the first NB channel 60d-1 may be a sub-channel of the candidate UWB channel (e.g., channel 7) of Table 1.

As an embodiment, the single advertisement channel 60d-1 may be synchronized with a plurality of UWB channels 70d-1 and 70d-2. For example, the first NB advertisement channel 60d-1 may be synchronized with the first UWB channel 70d-1, and the second UWB channel 70d-2. The synchronization of the NB channel and the UWB channel may be referred to the following description, for example, the description of embodiments of FIGS. 7 to 14.

As an embodiment, the UWB device serving as the advertiser may transmit a first advertisement message (packet) for the first UWB channel 70d-1 through the first NB advertisement channel 60d-1 and a second advertisement message (packet) for the second UWB channel (70d-2), and the UWB device serving as a scanner may receive a first advertisement message (packet) for the first UWB channel 70d-1 through the first NB advertisement channel 60d-1 and a second advertisement message (packet) for the second UWB channel (70d-2).

As an embodiment, the UWB device (scanner) may scan the first NB advertisement channel 60d-1 based on a predetermined scan interval and scan window.

As an embodiment, each advertisement message transmitted through the single advertisement channel 60d-1 may include information for indicating use of the corresponding UWB channels 70d-1 and 70d-2. For example, the first advertisement message for the first UWB channel 70d-1 may include channel number information of the first UWB channel 70d-1 to be used, and the second advertisement message for the second UWB channel 70d-2 may include channel number information of the second UWB channel 70d-2 to be used.

In the case of an embodiment of FIG. 6D, the UWB device may operate only one NB advertisement channel instead of operating a separate NB advertisement channel for each UWB channel, thereby increasing the efficiency of resource use compared to the embodiment of FIG. 6C.

Hereinafter, various embodiments of the disclosure will be described using a case in which one UWB channel is used as an example, but the same description may be applied even when a plurality of UWB channels are used.

Figure 7:
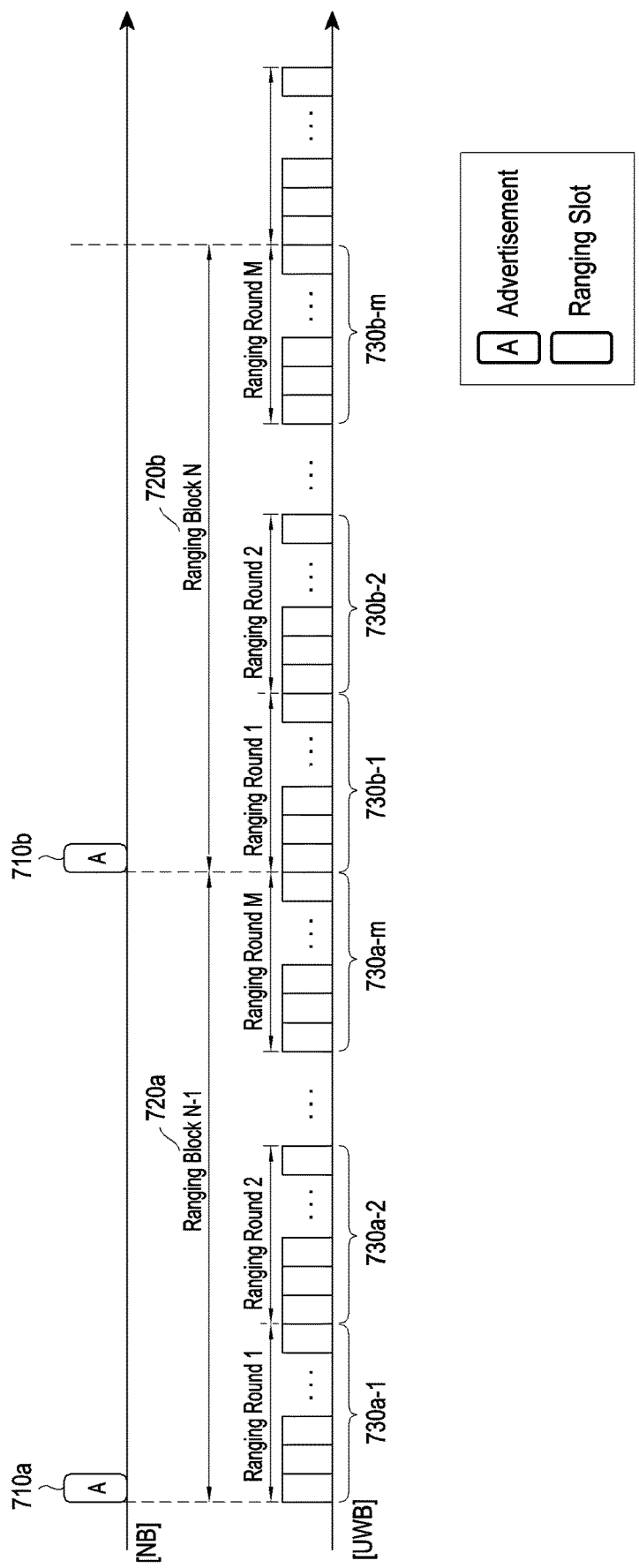
FIG. 7 illustrates a structure of a channel used in a ranging area network according to an embodiment of the disclosure.

FIG. 7 illustrates a structure of a channel used in a ranging area network according to an embodiment of the disclosure.

The ranging area network of FIG. 7 may correspond to the ranging area network of FIG. 6A.

In an embodiment of FIG. 7, ranging blocks, ranging rounds, and ranging slots transmitted through the UWB channel may be the ranging blocks, ranging rounds, and ranging slots used in a session (e.g., UWB ranging session) already configured by the UWB device (e.g., the first UWB device 601 of FIG. 6A) serving as an advertiser/controller.

Referring to FIG. 7, an NB channel and a UWB channel may be used in the ranging area network.

In an embodiment, the NB channel may be used to transmit and/or receive at least one advertisement message. For example, the NB channel may be used to transmit/receive the first advertisement message 710a and the second advertisement message 710b. As described above, the NB channel for the advertisement message may be referred to as an NB advertisement channel.

In addition, the NB channel may be used to transmit and/or receive at least one additional advertisement message, a connection request message and/or a connection confirmation message. As described above, the NB channel for the additional advertisement message, the connection request message, and/or the connection confirmation message may be referred to as an NB connection setup channel.

In an embodiment, the UWB channel may be used to transmit and/or receive at least one ranging message for UWB ranging. At least one ranging message may be transmitted/received through the ranging blocks 720a and 720b.

As illustrated in FIG. 5, each ranging block may include at least one ranging round, and each ranging round may include at least one ranging slot. For example, as shown in FIG. 7, the first ranging block 720a may include M ranging rounds 730a-1, 730a-2, . . . , and 730a-m, and each ranging round may include a plurality of ranging slots. In addition, the second ranging block 720b may include M ranging rounds 730b-1, 730b-2, . . . , and 730b-m, and each ranging round may include a plurality of ranging slots.

In an embodiment, the NB channel (or NB transceiver) and the UWB channel (or UWB transceiver) may be, for example, fully synchronized. In this case, 1) Mutual discovery between UWB devices is enabled by using energy detection (ED) on the NB channel through the newly defined PHY layer entity to support the NB channel 2) In addition, by using the advertisement message received through the NB channel, it is possible to identify the start time point, structure, etc. of the ranging block transmitted through the UWB channel. In this case, some information on the already configured current UWB session may be implicitly signaled. 3) In addition, it is possible to turn on/off the use of the NB channel and the use of the UWB channel, thereby enabling power saving.

In the following embodiment, it is assumed that the NB channel and the UWB channel are fully synchronized, for example, and various embodiments of the disclosure are described. However, the disclosure is not limited thereto. For example, the embodiments of the disclosure may be partially adjusted and applied according to the situation even if the NB channel and the UWB channel are partially synchronized or not synchronized.

Figure 8:
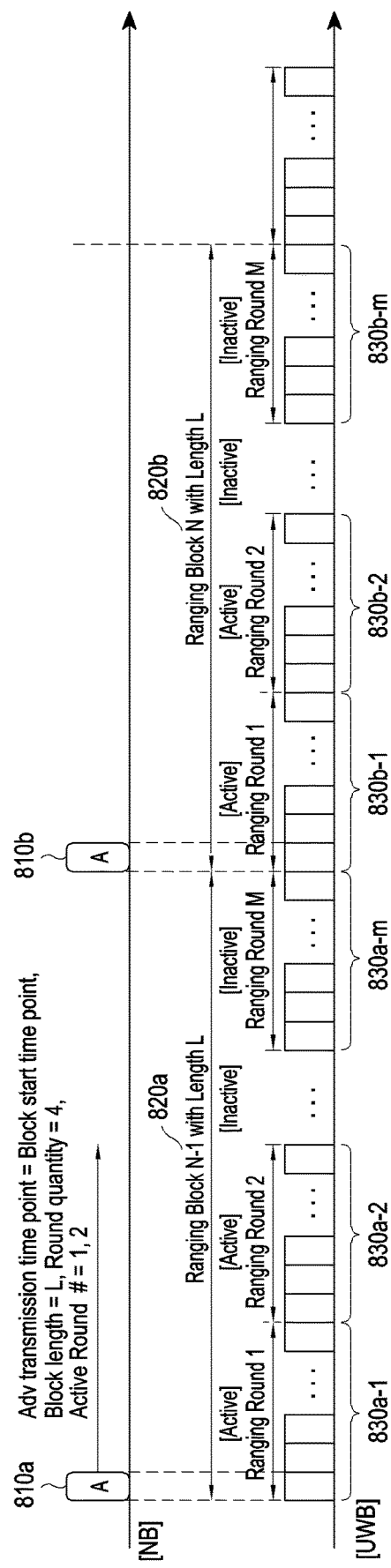
FIG. 8 illustrates a first method in which a UWB device transmits an NB advertising message in an NB channel according to an embodiment of the disclosure.

FIG. 8 illustrates a first method in which a UWB device transmits an NB advertising message in an NB channel according to an embodiment of the disclosure.

In an embodiment of FIG. 8, the UWB device transmitting the NB advertisement message may be a UWB device serving as a controller and an advertiser. For example, the UWB device of FIG. 8 may be the first UWB device 601 of FIG. 6A.

Transmission of the NB advertisement message of the embodiment of FIG. 8 may be controlled/managed by the MAC layer of the UWB device.

In an embodiment of FIG. 8, each ranging block may include at least one ranging round, and each ranging round may include at least one ranging slot. For example, as shown in FIG. 8, the first ranging block 820a may include M ranging rounds 830a-1, 830a-2, . . . , and 830a-m, and each ranging round may include a plurality of ranging slots. In addition, the second ranging block 820b may include M ranging rounds 830b-1, 830b-2, . . . , and 830b-m, and each ranging round may include a plurality of ranging slots.

Referring to FIG. 8, the UWB device may transmit the NB advertisement message at the start time point of each ranging block (i.e., at each start time point of the ranging block) through the NB channel. For example, the UWB device may transmit the first NB advertisement message 810a at the start time point of the first ranging block 820a through the NB advertisement channel, and transmit the second NB advertisement message 810b at the start time point of the second ranging block 820b through the NB advertisement channel Here, the start time point may be the start time point of the first slot of the corresponding ranging block.

As such, in a case where the NB advertisement message is transmitted at the start time point of each ranging block, even if information on the start time point of the corresponding ranging block is not included in the NB advertisement message, the start time point of the corresponding ranging block may be identified through the transmission time (or reception time) of the NB advertisement message. That is, even without explicit signaling, the start time point of the ranging block may be implicitly signaled.

In an embodiment, the transmission time of the NB advertisement message may be identified based on a transmission timestamp included in the NB advertisement message.

In an embodiment, the NB advertisement message may include information on a UWB channel (UWB channel information). For example, the NB advertisement message may include occupancy information on a UWB channel (UWB channel occupancy information). For example, the UWB channel information or the UWB channel occupancy information may include at least one of information on the start time point of the ranging round, information on the channel occupancy time (e.g., information on channel occupancy time expressed as a multiple of time unit (TU)), information on the length of the ranging block, information on the length of the ranging round, or information on the number or number of active rounds. Here, the active round may be a ranging round that is actually used (or occupied) among the ranging rounds.

In an embodiment, the NB Advertisement message may include configuration information (UWB configuration information) for reception of a message (or packet) (or frame) in a UWB channel. For example, the UWB configuration information may include information on the PHY configuration and/or information on the STS index.

As illustrated in FIG. 8, the first NB advertisement message 810a transmitted at the start time point of the first ranging block 820a may include information on the length of the ranging block set to L, information on the number of ranging rounds set to 4, and information on number of active rounds set to '1 and 2'. Through this, the start time point of the first ranging block 820a may be implicitly signaled, and the length of the first ranging block 820a, the number of ranging rounds included in the first ranging block 820a, and the active rounds number may be explicitly signaled. Accordingly, a UWB device receiving the first NB advertisement message 810a may identify the start time point and the total length L of the first ranging block 820a, and identify that the first ranging block 820a includes four ranging rounds, and among them, the first and second rounds are in an active state. The UWB device may perform UWB ranging based on the identified information. As ranging rounds 830a-1, 830a-2, 830a-m, 830b-1, 830b-2, and 830a-m correspond to the ranging rounds shown in FIG. 7, a detailed description thereof is omitted.

Figure 9:
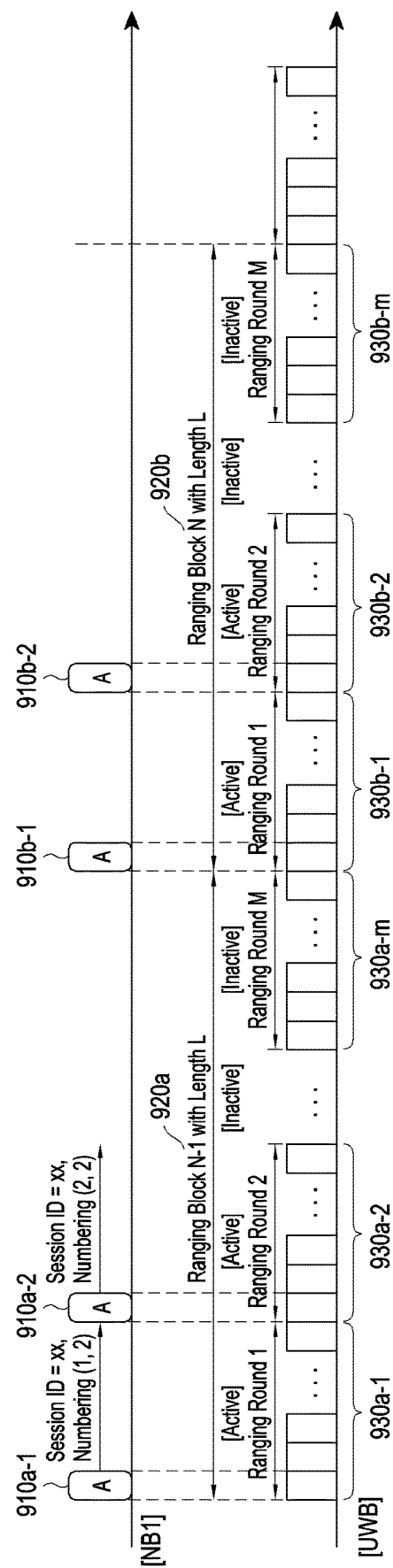
FIG. 9 illustrates a second method in which a UWB device transmits an NB advertising message in an NB channel according to an embodiment of the disclosure.

FIG. 9 illustrates a second method in which a UWB device transmits an NB advertising message in an NB channel according to an embodiment of the disclosure.

In an embodiment of FIG. 9, the UWB device transmitting the NB advertisement message may be a UWB device serving as a controller and an advertiser. For example, the UWB device of FIG. 9 may be the first UWB device 601 of FIG. 6A.

Transmission of the NB advertisement message of the embodiment of FIG. 9 may be controlled/managed by the MAC layer of the UWB device.

Referring to FIG. 9, the UWB device may transmit the NB advertisement message at the start time point of each active round (i.e., at each start time point of the active round) through the NB channel. For example, the UWB device may transmit an NB advertisement message 910a-1 and an NB advertisement message 910a-2, respectively at the start time point of an active round 930a-1 and the start time point of an active round 930a-2 of a first ranging block 920a through the NB advertisement channel, and transmit the NB advertisement message 910b-1 and the NB advertisement message 910b-2, respectively at the start time point of the active round 930b-1 and the start time point of the active round 930b-2 of the second ranging block 920b through the NB advertisement channel Here, the start time point may be the start time point of the first slot of the corresponding active round.

As such, in a case where the NB advertisement message is transmitted at the start time point of each active round, even if information on the number and start time point of the active round and the start time point is not included in the NB advertisement message, the number and start time point of the active round may be identified through the number of times and the time of transmission (or time of reception) of the NB advertisement message. That is, even without explicit signaling, the number and start time point of the active round may be implicitly signaled. In addition, the length of the ranging round may be estimated through the spacing (transmission spacing) of the NB advertisement message.

Accordingly, when the method of FIG. 9 is followed, at least one of information included in the NB advertisement message of the embodiment of FIG. 8 may be excluded from the NB advertisement message. For example, the NB advertisement message of FIG. 9 may not include at least one of the length of the corresponding ranging block, the length of the ranging round, or information (the number/number) on the active round. Through this, it is possible to reduce the congestion level of the NB advertisement channel.

In an embodiment, the transmission time of the NB advertisement message may be identified based on a transmission timestamp included in the NB advertisement message.

On the other hand, for example, in a case where one ranging block is used by a plurality of controllers, active rounds included in the corresponding ranging block may be used by different controllers. Therefore, it needs to be signaled whether the active rounds belong to the same session or are used by the same controller.

In an embodiment, the NB advertisement message may include information for identifying whether active rounds included in the same block belong to the same session or are used by the same controller. For example, the NB advertisement message may include information on the session ID (session ID information) of the session (e.g., a ranging session) to which the corresponding active round belongs and/or information on the address (e.g., a source MAC address) of the UWB device that transmits the NB advertisement message associated with the corresponding active round.

This session ID information or address information may be used to distinguish whether active round(s) in the same ranging block belong to the same session (or whether the active round(s) is (are) used by the same controller) or different sessions (or whether the active round(s) is (are) used by the different controller). For example, the active rounds corresponding to NB advertisement messages including the same session ID (or address) in the same ranging block may be active rounds belonging to the same session.

In an embodiment, the NB advertisement message may include numbering information for indicating which active round the NB advertisement message corresponds to among all active rounds in the corresponding ranging block. For example, as illustrated, in a case where the numbering information is set to (1,2), the numbering information may indicate that the corresponding NB advertisement message corresponds to the first active round among all two active rounds in the corresponding ranging block. Alternatively, in a case where the numbering information is set to (2,2), the numbering information may indicate that the corresponding NB advertisement message corresponds to the second active round among all two active rounds in the corresponding ranging block.

In an embodiment of FIG. 9, each ranging block may include at least one ranging round, and each ranging round may include at least one ranging slot. For example, as shown in FIG. 9, the first ranging block 920a may include M ranging rounds 930a-1, 930a-2, . . . , and 930a-m, and each ranging round may include a plurality of ranging slots. In addition, the second ranging block 920b may include M ranging rounds 930b-1, 930b-2, . . . , and 930b-m, and each ranging round may include a plurality of ranging slots.

As illustrated in FIG. 9, the NB advertisement message 910a-1 transmitted at the start time point of the active round 930a-1 includes session ID information set to 'Session ID=xx' and numbering information set to (1,2), and the NB advertisement message 910a-2 transmitted at the start time point of the active round 930a-2 includes session ID information set to 'Session ID=xx' and numbering information set to (2, 2). In this case, the session ID of the NB advertisement message 910a-1 and the session ID of the NB advertisement message 910a-2 are the same.

The UWB device (receiving UWB device) that has received the NB advertisement message 910a-1 and the NB advertisement message 910a-2, through the included information, may identify that the active round (930a-1) corresponding to the NB advertisement message (910a-1) and the active round (930a-2) corresponding to the NB advertisement message (910a-2) correspond to the active round belonging to the same session, and the active round 930a-1 is the first active round among the two active rounds, and the active round 930a-2 is the second active round among the two active rounds.

In addition, the receiving UWB device may identify the spacing between the active round (930a-1) and the active round (930a-2) through the spacing between the NB advertisement message (910a-1) and the NB advertisement message (910a-2), and through this, may estimate the length of the active round. The UWB device may perform UWB ranging based on the identified information.

On the other hand, when there is no active round in the corresponding ranging block, as illustrated in FIG. 8, the UWB device may transmit an NB advertisement message at the start time point of the corresponding ranging block.

Figure 10:
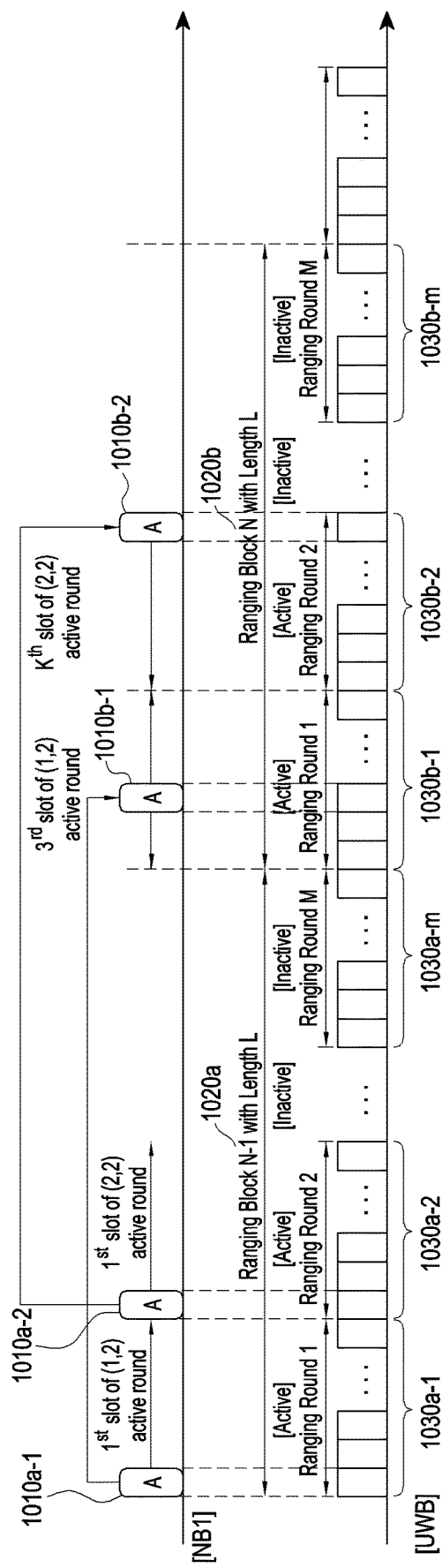
FIG. 10 illustrates a third method in which a UWB device transmits an NB advertising message in an NB channel according to an embodiment of the disclosure.

FIG. 10 illustrates a third method in which a UWB device transmits an NB advertising message in an NB channel according to an embodiment of the disclosure.

In an embodiment of FIG. 10, the UWB device transmitting the NB advertisement message may be a UWB device serving as a controller and an advertiser. For example, the UWB device of FIG. 10 may be the first UWB device 601 of FIG. 6A.

Transmission of the NB advertisement message of the embodiment of FIG. 10 may be controlled/managed by the MAC layer of the UWB device.

In an embodiment of FIG. 10, each ranging block may include at least one ranging round, and each ranging round may include at least one ranging slot. For example, as shown in FIG. 10, the first ranging block 1020a may include M ranging rounds 1030a-1, 1030a-2, . . . , and 1030a-m, and each ranging round may include a plurality of ranging slots. In addition, the second ranging block 1020b may include M ranging rounds 1030b-1, 1030b-2, . . . , and 1030b-m, and each ranging round may include a plurality of ranging slots.

Referring to FIG. 10, the UWB device may transmit the NB advertisement message in one selected slot among slots in each ranging block or each active round through the NB channel. The selected slot may not be the starting slot. For example, the UWB device may transmit the NB advertisement message 1010b-1 in the third slot of the active round 1030b-1 of the second ranging block 1020b through the NB advertisement channel, and may transmit the NB advertisement message 1010b-2 in the $k^{th}$ slot of the active round 1030b-2 of the second ranging block 1020b through the NB advertisement channel.

In a case where a plurality of UWB devices transmit advertisement messages, an infinite collision may occur between the NB advertisement messages that are always transmitted at the same time (e.g., the start time point of each ranging block or the start time point of each active round) of the NB. Accordingly, as in the embodiment of FIG. 10, in a case where the transmission time of the NB advertisement message is not always used at the same fixed time point, but is randomly selected and used, collision between these NB Advertisement messages may be avoided.

However, to indicate the transmission time of the NB advertisement message, the NB advertisement message may include information on the transmission time of the current (own) NB Advertisement message and/or information on a transmission time of a corresponding NB advertisement message transmitted after the current NB advertisement message.

In an embodiment, the NB advertisement message may include information (transmission slot indication information) indicating at which slot the transmission of the current NB Advertisement message or the corresponding NB Advertisement message starts (slot unit shift) and/or information on the length of the slot (slot length information).

For example, the NB advertisement message 1010a-1 transmitted from the first active round 1030a-1 of the first ranging block 1020a may include transmission slot indication information (e.g., information indicating that transmission of the corresponding NB advertisement message is started in the 3rd slot) on the NB advertisement message 1010b-1 transmitted from the first active round 1030b-1 of the second ranging block 1020b and/or slot length information. Alternatively, the NB advertisement message 1010a-2 transmitted from the second active round 1030a-2 of the first ranging block 1020a may include transmission slot indication information (e.g., information indicating that transmission of the corresponding NB advertisement message is started in the $k^{th}$ slot) on the NB advertisement message 1010b-2 transmitted from the second active round 1030b-2 of the second ranging block 1020b and/or slot length information. Through this, the transmission time of the NB Advertisement message transmitted from the following ranging block may be identified.

For another example, the NB advertisement message 1010a-1 transmitted from the first active round 1030a-1 of the first ranging block 1020a may include transmission slot indication information (e.g., information indicating that transmission of the current (own) NB Advertisement message is started in the 1st slot) on the current NB advertisement message 1010a-1 and/or slot length information. Alternatively, the NB advertisement message 1010a-2 transmitted from the second active round 1030a-2 of the first ranging block 1020a may include transmission slot indication information (e.g., information indicating that transmission of the current (own) NB Advertisement message is started in the 1st slot) on the current (own) NB advertisement message 1010a-2 and/or slot length information. Through this, the transmission time of the own NB advertisement message may be identified.

For another example, the NB advertisement message 1010a-1 transmitted from the first active round 1030a-1 of the first ranging block 1020a may include transmission slot indication information (e.g., information indicating that transmission of the current (own) NB advertisement message is started in the 1st slot) on the current NB advertisement message 1010a-1 and/or slot length information, and may include transmission slot indication information (e.g., information indicating that transmission of the corresponding NB advertisement message is started in the 3rd slot) on the NB advertisement message 1010b-1 transmitted from the first active round 1030b-1 of the second ranging block 1020b and/or slot length information together. Alternatively, the NB advertisement message 1010a-2 transmitted from the second active round 1030a-2 of the first ranging block 1020a may include transmission slot indication information (e.g., information indicating that transmission of the current (own) NB advertisement message is started in the 1st slot) on the current (own) NB advertisement message 1010a-2 and/or slot length information, and may include transmission slot indication information (e.g., information indicating that transmission of the corresponding NB advertisement message is started in the $k^{th}$ slot) on the NB advertisement message 1010b-2 transmitted from the second active round 1030b-2 of the second ranging block 1020b and/or slot length information together. Through this, the transmission time of the own NB advertisement message and the transmission time of another NB advertisement message transmitted from the following ranging block may be identified.

Figure 11:
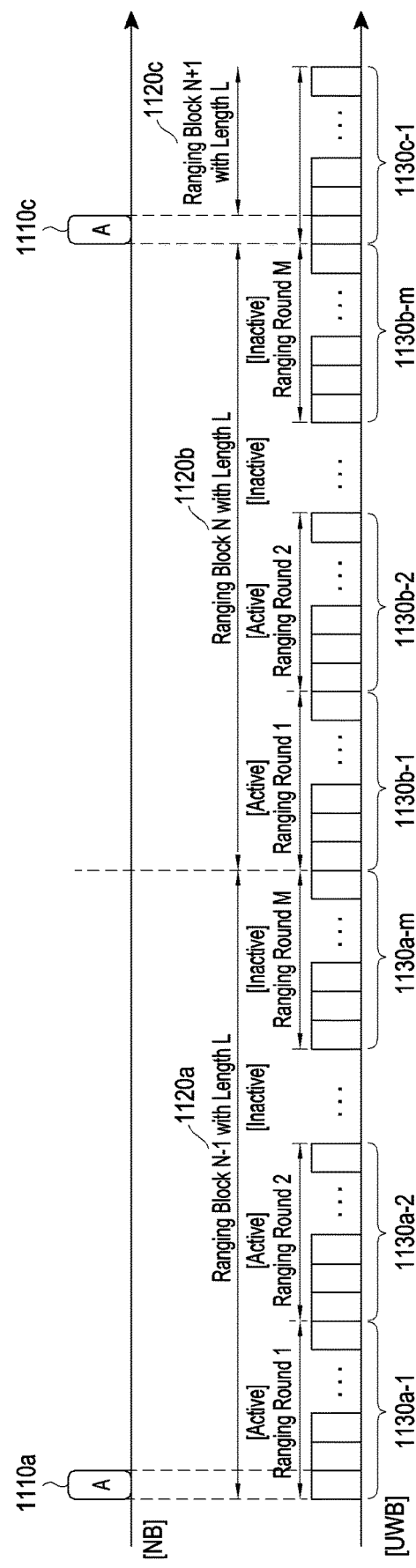
FIG. 11 illustrates a fourth method in which a UWB device transmits an NB advertising message in an NB channel according to an embodiment of the disclosure.

FIG. 11 illustrates a fourth method in which a UWB device transmits an NB advertising message in an NB channel according to an embodiment of the disclosure.

In an embodiment of FIG. 11, the UWB device transmitting the NB advertisement message may be a UWB device serving as a controller and an advertiser. For example, the UWB device of FIG. 11 may be the first UWB device 601 of FIG. 6A.

Transmission of the NB advertisement message of the embodiment of FIG. 11 may be controlled/managed by the MAC layer of the UWB device.

In an embodiment of FIG. 11, each ranging block may include at least one ranging round, and each ranging round may include at least one ranging slot. For example, as shown in FIG. 11, the first ranging block 1130a may include M ranging rounds 1130a-1, 1130a-2, . . . , and 1130a-m, and each ranging round may include a plurality of ranging slots. In addition, the second ranging block 1120b may include M ranging rounds 1130b-1, 1130b-2, . . . , and 1130b-m, and each ranging round may include a plurality of ranging slots. In addition, the third ranging block 1120c may include M ranging rounds having 1130c-1, and each ranging round may include a plurality of ranging slots.

Referring to FIG. 11, the UWB device may transmit the NB advertisement message once in multiple ranging blocks, rather than transmitting the NB advertisement message for every ranging block through the NB channel. For example, the UWB device may transmit the NB advertisement message 1110a in the first ranging block 1120a, and transmit the NB advertisement message 1110c in the third ranging block 1120c through the NB advertisement channel without transmitting the NB advertisement message in the second ranging block 1120b. In this way, the NB advertisement message may be transmitted once for every two ranging blocks. As such, transmission power consumption may be reduced by transmitting the NB advertisement message once every preset period instead of transmitting the NB advertisement message at every ranging block.

On the other hand, a period of the ranging block in which the NB advertisement message is transmitted may be set in various ways according to embodiments. In an embodiment, the NB advertisement message may include information on a period of the ranging block in which the NB advertisement message is transmitted. For example, the information on the period of the NB advertisement message or the ranging block may include information on how many ranging blocks are skipped (first information) or information on the number of consecutive ranging blocks in which the NB advertisement message is not transmitted (second information). Based on this information, the UWB device receiving the NB advertisement message may identify how many ranging blocks have been skipped without transmitting the NB Advertisement message.

For example, in the illustrated embodiment, the NB advertisement message may include the first information or the second information set to 1. In this case, the UWB device receiving the corresponding NB advertisement message may identify that one ranging block has been skipped without transmitting the NB advertisement message.

On the other hand, transmission of the NB advertisement message in the ranging block in which the NB advertisement message is transmitted may be performed by using, for example, one method among FIG. 8, 9, or 11, or a combination thereof. For example, according to the method of FIG. 8, the NB advertisement message may be transmitted at the start time point of the ranging block, according to the method of FIG. 9, the NB advertisement message may be transmitted at the start time point of the active round, according to the method of FIG. 10, the NB advertisement message may be transmitted from the ranging block or any selected slot of the active round, or the NB advertisement message may be transmitted according to a combination thereof.

Figure 12:
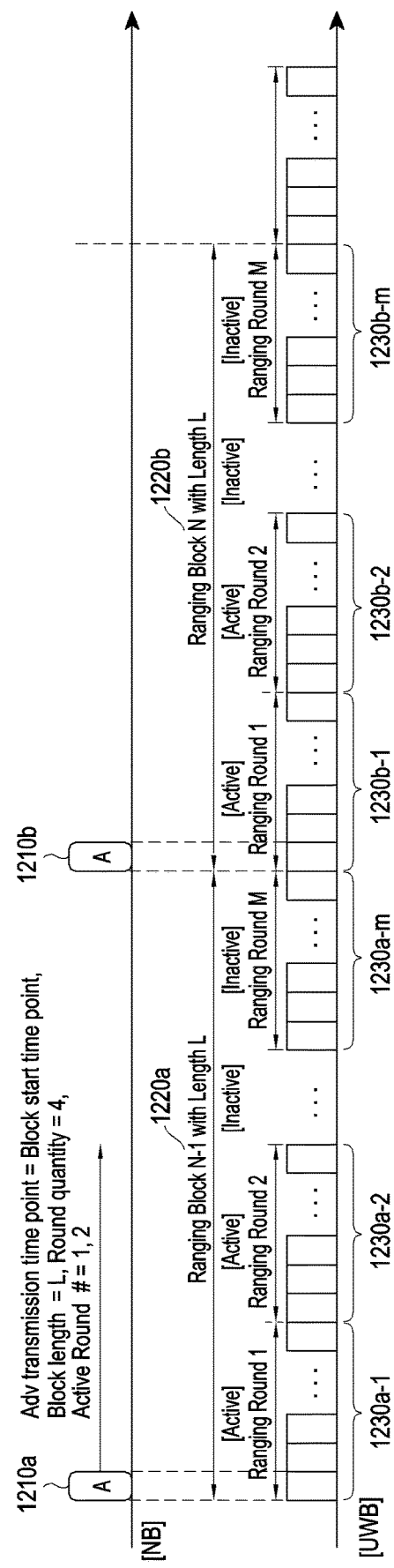
FIG. 12 illustrates an operation of a UWB device that has received an NB advertisement message in an NB channel according to an embodiment of the disclosure.

FIG. 12 illustrates an operation of a UWB device that has received an NB advertisement message in an NB channel according to an embodiment of the disclosure.

In an embodiment of FIG. 12, the UWB device receiving the NB advertisement message may be a UWB device serving as a controller and a scanner. For example, the UWB device of FIG. 12 may be the third UWB device 603 of FIG. 6A.

Reception and processing of the NB advertisement message of the embodiment of FIG. 12 may be controlled/managed by the MAC layer of the UWB device.

In an embodiment of FIG. 12, each ranging block may include at least one ranging round, and each ranging round may include at least one ranging slot. For example, as shown in FIG. 12, the first ranging block 1230*a* may include M ranging rounds 1230*a*-1, 1230*a*-2, . . . , and 1230*a*-*m*, and each ranging round may include a plurality of ranging slots. In addition, the second ranging block 1220*b* may include M ranging rounds 1230*b*-1, 1230*b*-2, . . . , and 1230*b*-*m*, and each ranging round may include a plurality of ranging slots.

In an embodiment of FIG. 12, as illustrated in the embodiment of FIG. 8, it is assumed that a first NB advertisement message 1210*a* corresponds to the NB advertisement message transmitted at the start time point of a first ranging block 1220*a*, and a second NB advertisement message 1210*b* corresponds to the NB advertisement message transmitted at the start time point of a second ranging block 1220*b*. However, the embodiment is not limited thereto. For example, the first NB advertisement message 1210*a* and the second NB advertisement message 1210*b* may be NB advertisement messages transmitted according to one or a combination of the transmission methods of FIGS. 8 to 11.

Referring to FIG. 12, the UWB device may receive an NB advertisement message by scanning an NB channel. For example, the UWB device may receive the first NB advertisement message 1210*a* and the second NB advertisement message 1210*b* transmitted at the start time point of each ranging block by scanning the NB advertisement channel. As illustrated, the first NB advertisement message 1210*a* may include, for example, block length information set to L, the number of ranging information set to 4, and active round number information set to '1 and 2'. Accordingly, ranging block 1220*a* may include active rounds 1230*a*-1 and 1230*a*-2, and inactive round 1230*a*-*m*. Similarly, ranging block 1220*b* may include active rounds 1230*b*-1 and 1230*b*-2, and inactive round 1230*b*-*m*.

Through this, the UWB device may identify that the start time point of the first ranging block 1220*a* corresponding to the first NB advertisement message 1210*a* corresponds to the transmission time of the first NB advertisement message 1210*a*, the length of the first ranging block 1220*a* corresponds to L, the total number of ranging rounds included in the first ranging block 1220*a* is 4, and the active round numbers included in the ranging block 1220*a* are 1 and 2. Through this, the UWB device may determine a surrounding UWB usage environment.

After determining the UWB usage environment, the UWB device, as a controller, may determine UWB settings such as a ranging block length, a start time point, and a transmission offset for its UWB session, and may start its own UWB session based on the determination.

In an embodiment, the transmission offset may be appropriately adjusted according to the duration of the ranging slot and/or the duration of the UWB message (e.g., RFRAME). Collision avoidance is possible through the setting of such a transmission offset.

In addition, in a case where the UWB device activates the UWB transceiver for UWB communication, the UWB device may deactivate the NB transceiver for NB advertisement reception. Through this, power saving is possible.

Figure 13:
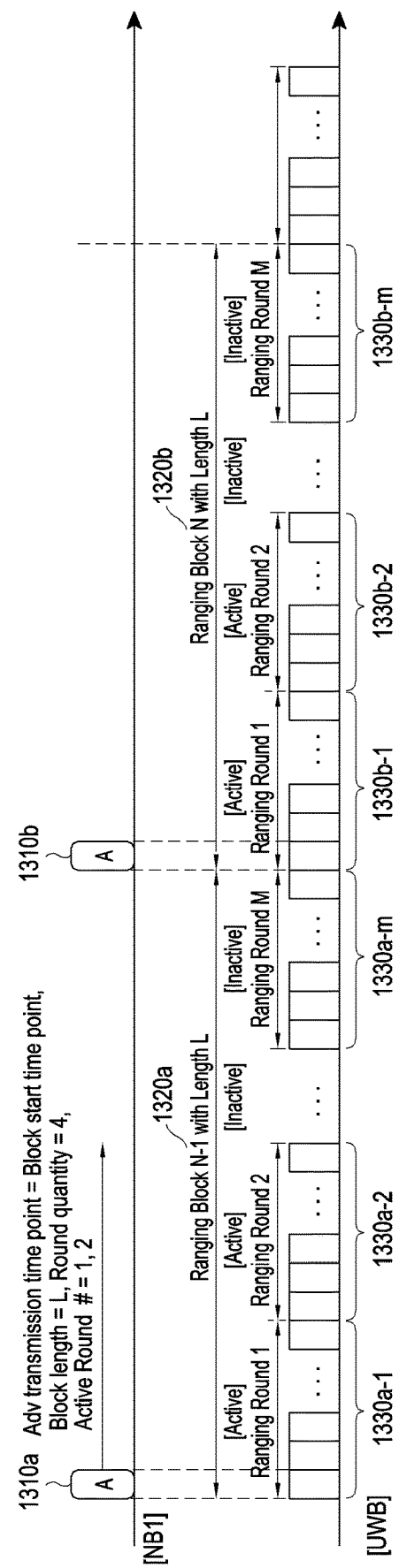
FIG. 13 illustrates an operation of a UWB device that has received an NB advertisement message in an NB channel according to an embodiment of the disclosure.

FIG. 13 illustrates an operation of a UWB device that has received an NB advertisement message in an NB channel according to an embodiment of the disclosure.

In an embodiment of FIG. 13, the UWB device receiving the NB advertisement message may be a UWB device serving as a controller and a scanner. For example, the UWB device of FIG. 13 may be the third UWB device 603 of FIG. 6A.

Reception and processing of the NB advertisement message of the embodiment of FIG. 13 may be controlled/managed by the MAC layer of the UWB device.

In an embodiment of FIG. 13, each ranging block may include at least one ranging round, and each ranging round may include at least one ranging slot. For example, as shown in FIG. 13, the first ranging block 1330*a* may include M ranging rounds 1330*a*-1, 1330*a*-2, . . . , and 1330*a*-*m*, and each ranging round may include a plurality of ranging slots. In addition, the second ranging block 1320*b* may include M ranging rounds 1330*b*-1, 1330*b*-2, . . . , and 1330*b*-*m*, and each ranging round may include a plurality of ranging slots.

In an embodiment of FIG. 13, as illustrated in the embodiment of FIG. 8, it is assumed that a first NB advertisement message 1310*a* corresponds to the NB advertisement message transmitted at the start time point of a first ranging block 1320*a*, and a second NB advertisement message 1310*b* corresponds to the NB advertisement message transmitted at the start time point of a second ranging block 1320*b*. However, the embodiment is not limited thereto. For example, the first NB advertisement message 1310*a* and the second NB advertisement message 1310b may be NB advertisement messages transmitted according to one or a combination of the transmission methods of FIGS. 8 to 11.

Referring to FIG. 13, the UWB device may receive an NB advertisement message by scanning an NB channel. For example, the UWB device may receive the first NB advertisement message 1310a and the second NB advertisement message 1310b transmitted at the start time point of each ranging block by scanning the NB advertisement channel. As illustrated, the first NB advertisement message 1310a may include, for example, block length information set to L, the number of ranging information set to 4, and active round number information set to '1 and 2'. Accordingly, ranging block 1320a may include active rounds 1330a-1 and 1330a-2, and inactive round 1330a-m. Similarly, ranging block 1320b may include active rounds 1330b-1 and 1330b-2, and inactive round 1330b-m.

Through this, the UWB device may identify that the start time point of the first ranging block 1320a corresponding to the first NB advertisement message 1310a corresponds to the transmission time of the first NB advertisement message 1310a, the length of the first ranging block 1320a corresponds to L, the total number of ranging rounds included in the first ranging block 1320a is 4, and the active round numbers included in the ranging block 1320a are 1 and 2. Through this, the UWB device may determine a surrounding UWB usage environment.

After determining the UWB usage environment, when there is a UWB session to participate in, the UWB device, as a controlee, may participate in the corresponding UWB session. For example, the UWB device may determine a UWB session to participate in based on information included in the NB Advertisement message, receive a control message through a UWB channel of the corresponding UWB session, and perform UWB ranging based on the control message. For another example, the UWB device may perform a connection setup operation for additional parameter exchange and/or authentication through the NB connection setup channel, and then perform UWB ranging through the UWB channel.

In addition, in a case where the UWB device activates the UWB transceiver for UWB communication, the UWB device may deactivate the NB transceiver for NB advertisement reception. Through this, power saving is possible.

Figure 14:
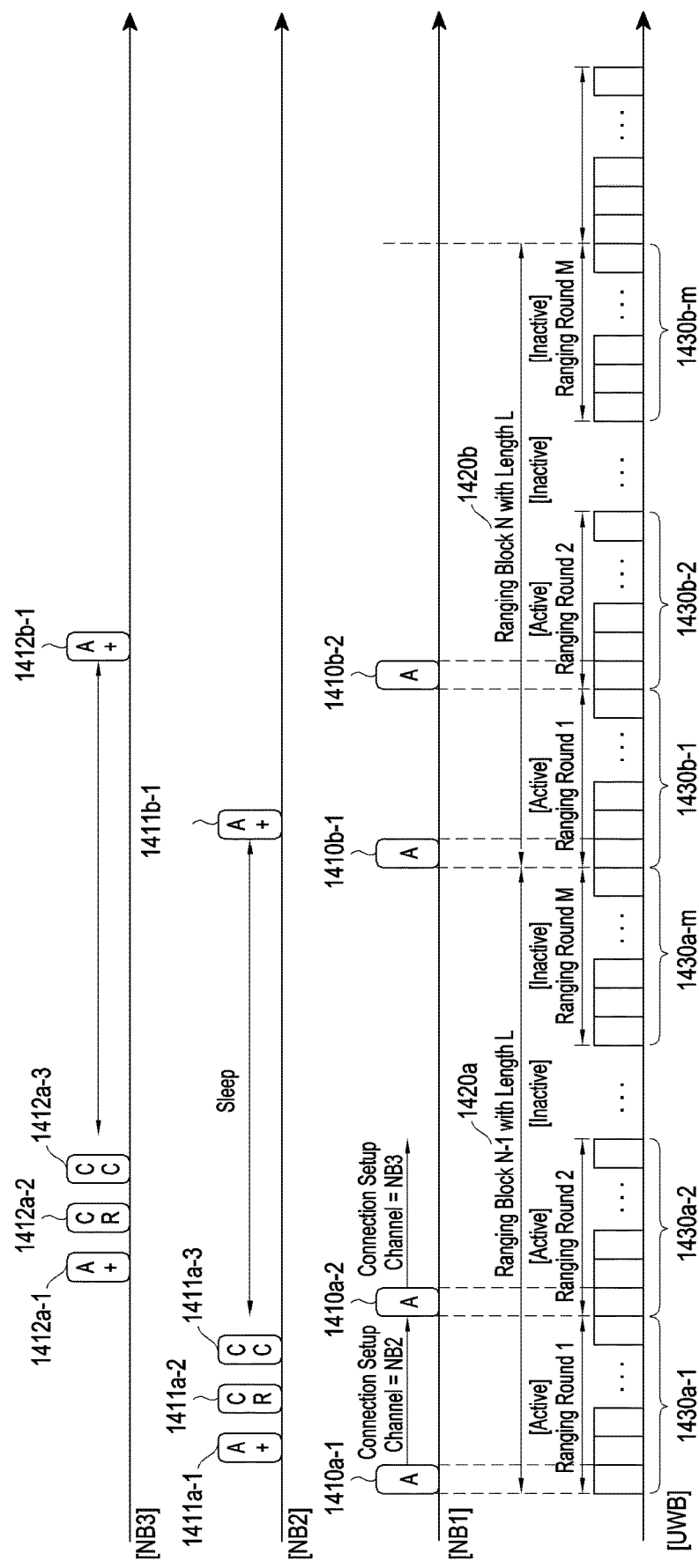
FIG. 14 illustrates an operation of a UWB device for setting up an NB connection according to an embodiment of the disclosure.

FIG. 14 illustrates an operation of a UWB device for setting up an NB connection according to an embodiment of the disclosure.

In an embodiment of FIG. 14, the UWB device (a first UWB device) transmitting the NB advertisement message may be a UWB device serving as a controller and an advertiser, and the UWB device (a second UWB device) receiving the NB advertisement message may be a UWB device serving as a controlee and a scanner. For example, the first UWB device of FIG. 14 may be the first UWB device 601 of FIG. 6A, and the second UWB device may be the third UWB device 603 of FIG. 6A.

The transmission/reception of the NB advertisement message, the transmission/reception of the additional NB advertisement message, the transmission/reception of the connection request message/connection response message, and processing thereof in the embodiment of FIG. 14 may be controlled/managed by the MAC layer of the UWB device.

In an embodiment of FIG. 14, each ranging block may include at least one ranging round, and each ranging round may include at least one ranging slot. For example, as shown in FIG. 14, the first ranging block 1430a may include M ranging rounds 1430a-1, 1430a-2, . . . , and 1430a-m, and each ranging round may include a plurality of ranging slots. In addition, the second ranging block 1420b may include M ranging rounds 1430b-1, 1430b-2, . . . , and 1430b-m, and each ranging round may include a plurality of ranging slots.

In an embodiment of FIG. 14, as illustrated in the embodiment of FIG. 9, it is assumed that the NB advertisement message is transmitted at the start time point of the active round. However, the embodiment is not limited thereto. For example, the NB advertisement message may be an NB advertisement message transmitted according to one or a combination of the transmission methods of FIGS. 8 to 11.

Referring to FIG. 14, the first UWB device may transmit the NB advertisement message at the start time point of each active round (i.e. at every start time point of the active round) through the NB channel. For example, the first UWB device may transmit an NB advertisement message 1410a-1 and an NB advertisement message 1410a-2, respectively at the start time points of an active round 1430a-1 and an active round 1430a-2 of a first ranging block 1420a through the NB advertisement channel (NB1), and may transmit an NB advertisement message 1410b-1 and an NB advertisement message 1410b-2, respectively at the start time points of an active round 1430b-1 and an active round 1430b-2 of an second ranging block 1420b through the NB advertisement channel (NB1).

On the other hand, in a case where the information provided from the NB advertisement message is not sufficient to perform UWB communication, the first UWB device may allocate a separate NB channel (connection setup channel) for additional information delivery or connection setup, and transmit the information on this allocation to the second UWB device through the NB advertisement message.

In an embodiment, the NB advertisement message may include information on a corresponding connection setup channel (connection setup channel information). For example, the NB advertisement message 1410a-1 and the NB advertisement message 1410b-1 may include connection setup channel information (e.g., sub-channel number) configured to NB2, and the NB advertisement message 1410a-2 and the NB advertisement message 1410b-2 may include connection setup channel information (e.g., sub-channel number) configured to NB3.

In an embodiment, the first UWB device may transmit an additional NB advertisement message including additional advertising information in the corresponding connection setup channel. For example, the first UWB device may broadcast additional NB advertisement messages 1411a-1 and 1411b-1 including additional advertising information on a connection setup channel corresponding to NB2, and the first UWB device may broadcast additional NB advertisement messages 1412a-1 and 1412b-1 including additional advertising information on a connection setup channel corresponding to NB3. In an embodiment, the additional NB advertisement message may include detailed structure information on the ranging block of the corresponding UWB session. The detailed structure information may include, for example, the length of the ranging block, the number/length of ranging rounds, and/or the number/length of ranging slots.

The second UWB device that wants to participate in a specific ranging block/round in the UWB channel may transmit a connection request message for this purpose. In an embodiment, the second UWB device may transmit the connection request message to the first UWB device in a corresponding connection setup channel. For example, the second UWB device may transmit the connection request message 1411a-2 to the first UWB device in a connection setup channel corresponding to NB2 and may transmit the connection request message 1412a-2 to the first UWB device in a connection setup channel corresponding to NB3.

In an embodiment, the first UWB device may transmit a connection confirmation message corresponding to the connection request message to the second UWB device in the corresponding connection setup channel. For example, the first UWB device may transmit the connection confirmation message 1411a-3 to the second UWB device in the connection setup channel corresponding to NB2, and may transmit the connection confirmation message 1412a-3 to the second UWB device in the connection setup channel corresponding to NB3. In an embodiment, the connection confirmation message may include slot assignment information.

On the other hand, the operation of exchanging the above-described connection request message and connection confirmation message may be repeatedly performed as many times as necessary. For example, in a case where an additional message exchange is required (i.e. in a case where the message exchange is required for further parameter negotiation and/or authentication) after performing one message exchange, the message exchange operation may be further performed as many times as necessary in the corresponding NB connection setup channel (sub-advancement channel).

In this way, in a case where an operation for delivery of an additional NB advertisement message and/or connection setup is performed through an NB channel (a connection setup channel) separate from the advertisement channel (discovery channel), it is possible to reduce congestion of the discovery channel and efficiently operate a plurality of NB channels.

On the other hand, when the message exchange procedure through the connection setup channel is completed, the corresponding connection setup channel may exist in a sleep state. In this case, the UWB device (or the NB transceiver of the UWB device) may not scan the corresponding channel until, for example, the corresponding connection setup channel of the next ranging block is activated, as illustrated.

Figure 15:
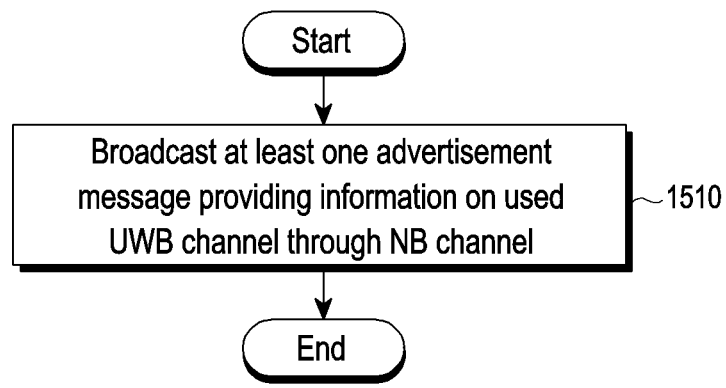
FIG. 15 is a flowchart illustrating a method of a first UWB device according to an embodiment of the disclosure.

FIG. 15 is a flowchart illustrating a method of a first UWB device according to an embodiment of the disclosure.

In an embodiment of FIG. 15, the first UWB device may be the UWB device of FIG. 1A or the first UWB device of FIG. 1B, and the second UWB device may be the UWB device of FIG. 1A or the second UWB device of FIG. 1B.

In an embodiment of FIG. 15, the first UWB device may serve as a controller/advertiser, and the second UWB device may serve as a controller/scanner or a controlee/scanner.

Referring to FIG. 15, the first UWB device may broadcast at least one advertisement message providing information on a UWB channel used by the first UWB device through the NB channel 1510. In an embodiment, the UWB channel may be one of candidate UWB channels allocated for UWB communication, and the NB channel may be a sub-channel of one of the candidate UWB channels.

In an embodiment, the broadcasting an advertisement message may include broadcasting the advertisement message at the start time point of each ranging block used in the UWB channel through the NB channel. In an embodiment, the advertisement message may include at least one of information on the length of the ranging block, information on the length of a ranging round included in the ranging block, information on the start time point of the ranging round, information on the number or number of active rounds, or information on the channel occupancy time of the UWB channel. This embodiment may refer to the description of the embodiment of FIG. 8. In an embodiment, each ranging block corresponds to a ranging block used in a UWB ranging session configured by the first UWB device.

In an embodiment, the broadcasting the advertisement message may include broadcasting the advertisement message through the NB channel at the start time point of each active round used in the UWB channel. In an embodiment, the advertisement message may include at least one of information for identifying whether active rounds included in the same ranging block belong to the same session or information for indicating which active round an active round is among all active rounds within the corresponding ranging block. This embodiment may refer to the description of the embodiment of FIG. 9. In an embodiment, each active round corresponds to an active round used in a UWB ranging session configured by the first UWB device.

In an embodiment, the broadcasting the advertisement message may include broadcasting the advertisement message through the NB channel in a selected slot of each ranging block or each active round used in the UWB channel. In an embodiment, the advertisement message may include at least one of information indicating from which slot the advertisement message is transmitted or information on the length of the slot. This embodiment may refer to the description of the embodiment of FIG. 10.

In an embodiment, the broadcasting the advertisement message may include broadcasting the advertisement message through the NB channel every preset period in ranging blocks used in the UWB channel. In an embodiment, the advertisement message may include information on a period of a ranging block from which the advertisement message is transmitted. This embodiment may refer to the description of the embodiment of FIG. 11.

In an embodiment, the above method may further include broadcasting an additional advertisement message including additional information through a second NB channel different from the NB channel; receiving a connection request message for connection setup from a second UWB device through the second NB channel; and transmitting a connection confirmation message corresponding to the connection request message to the second UWB device through the second NB channel. The advertisement message may include information on the second NB channel. This embodiment may refer to the description of the embodiment of FIG. 14.

Figure 16:
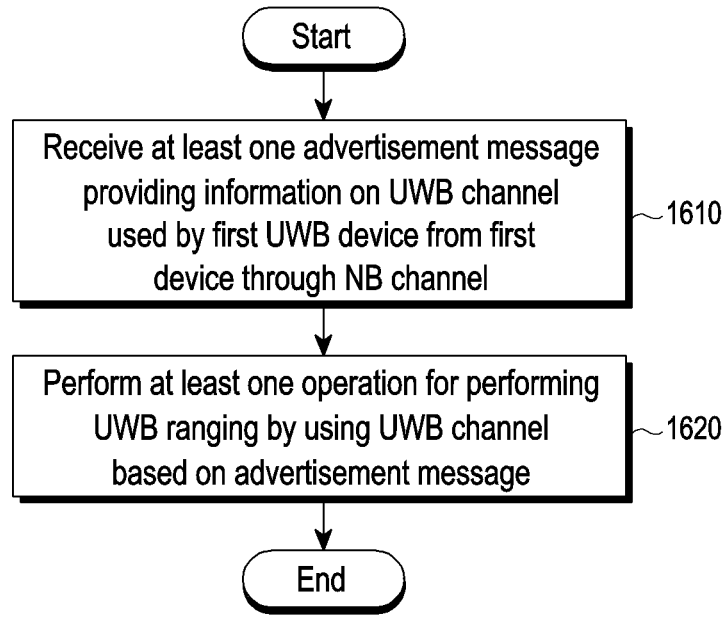
FIG. 16 is a flowchart illustrating a method of a first UWB device according to an embodiment of the disclosure.

FIG. 16 is a flowchart illustrating a method of a first UWB device according to an embodiment of the disclosure.

In an embodiment of FIG. 16, the first UWB device may be the UWB device of FIG. 1A or the first UWB device of FIG. 1B, and the second UWB device may be the UWB device of FIG. 1A or the second UWB device of FIG. 1B.

In an embodiment of FIG. 16, the first UWB device may serve as a controller/advertiser, and the second UWB device may serve as a controller/scanner or a controlee/scanner.

Referring to FIG. 16, the second UWB device may receive at least one advertisement message providing information on a UWB channel used by the first UWB device through the NB channel 1610.

The second UWB device may perform at least one operation for performing a UWB ranging by using the UWB channel based on the advertisement message 1620.

In an embodiment, the UWB channel may be one of candidate UWB channels allocated for UWB communication, and the NB channel may be a sub-channel of one of the candidate UWB channels.

In an embodiment, the advertisement message may be broadcasted by the first UWB device at the start time point of each ranging block used in the UWB channel through the NB channel. In an embodiment, the advertisement message may include at least one of information on the length of the ranging block, information on the length of a ranging round included in the ranging block, information on the start time point of the ranging round, information on the number or number of active rounds, or information on the channel occupancy time of the UWB channel. This embodiment may refer to the description of the embodiment of FIG. 8. In an embodiment, each ranging block corresponds to a ranging block used in a UWB ranging session configured by the first UWB device.

In an embodiment, the advertisement message may be broadcasted by the first UWB at the start time point of each active round used in the UWB channel through the NB channel. In an embodiment, the advertisement message may include at least one of information for identifying whether active rounds included in the same ranging block belong to the same session or information for indicating which active round an active round is among all active rounds within the corresponding ranging block. This embodiment may refer to the description of the embodiment of FIG. 9. In an embodiment, each active round corresponds to an active round used in a UWB ranging session configured by the first UWB device.

In an embodiment, the advertisement message may be broadcasted by the first UWB in a selected slot of each ranging block or each active round used in the UWB channel through the NB channel. In an embodiment, the advertisement message may include at least one of information indicating from which slot the advertisement message is transmitted or information on the length of the slot. This embodiment may refer to the description of the embodiment of FIG. 10.

In an embodiment, the advertisement message is broadcasted by the first UWB every preset period in ranging blocks used in the UWB channel through the NB channel. In an embodiment, the advertisement message may include information on a period of a ranging block from which the advertisement message is transmitted. This embodiment may refer to the description of the embodiment of FIG. 11.

In an embodiment, the above method may further include receiving an additional advertisement message including additional information through a second NB channel different from the NB channel; transmitting a connection request message for connection setup to the first UWB device through the second NB channel; and receiving a connection confirmation message corresponding to the connection request message from the first UWB device through the second NB channel, and the advertisement message may include information on the second NB channel. This embodiment may refer to the description of the embodiment of FIG. 14.

In an embodiment, performing at least one operation for performing the UWB ranging may include: performing an operation for participating in a first UWB ranging session controlled by the first UWB device; or performing an operation for configuring a second UWB ranging session controlled by the second UWB device, and the first UWB ranging session and the second UWB ranging session may use the UWB channel. This embodiment may refer to the description of the embodiments of FIGS. 12 and 13.

Figure 17:
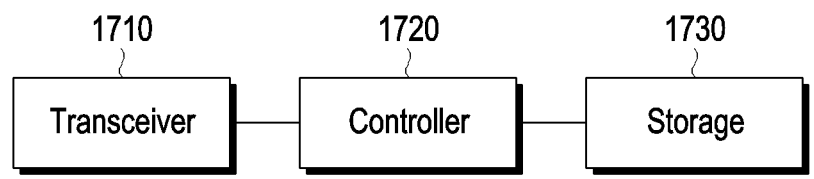
FIG. 17 illustrates a structure of a first UWB device according to an embodiment of the disclosure.

FIG. 17 illustrates a structure of a first UWB device according to an embodiment of the disclosure.

In an embodiment of FIG. 17, the first UWB device may correspond to the UWB device of FIGS. 1A and 1B, or include a UWB device, or may be an electronic device including a part of the UWB device.

In an embodiment of FIG. 17, the first UWB device may be a UWB device serving as a controller/advertiser.

Referring to FIG. 17, the first UWB device may include a transceiver 1710, a controller 1720, and a storage 1730. In the disclosure, the controller may be defined as a circuit, an application specific integrated circuit, or at least one processor.

The transceiver 1710 may transmit/receive a signal to/from another entity. The transceiver 1710 may transmit/receive data to/from another device by using, for example, at least one NB channel and/or at least one UWB channel.

In an embodiment, the transceiver 1710 may include a first transceiver supporting the NB channel and a second transceiver supporting the UWB channel. In another embodiment, the transceiver 1720 may include a transceiver supporting both the NB channel and the UWB channel.

The controller 1720 may control the overall operation of the electronic device according to the embodiment proposed in the disclosure. For example, the controller 1720 may control a signal flow between blocks to perform an operation according to the above-described flowchart. Specifically, the controller 1720 may, for example, control the operation of the first UWB device described with reference to FIGS. 1A, 1B, 2, 3A, 3B, 4A, 4B, 5, 6A, 6B, 6C, 6D, and 7 to 16 (e.g., the operation of the MAC entity of the first UWB device).

For example, the controller 1720 may broadcast at least one advertisement message providing information on the UWB channel used by the first UWB device through the NB channel.

The storage 1730 may store at least one of information transmitted and received through the transceiver 1710 and information generated through the controller 1720. For example, the storage unit 1730 may store, for example, information and data (e.g., advertising information) necessary for the method described with reference to FIGS. 1A, 1B, 2, 3A, 3B, 4A, 4B, 5, 6A, 6B, 6C, 6D, and 7 to 16.

Figure 18:
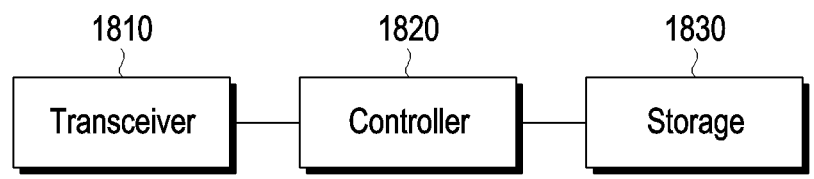
FIG. 18 illustrates a structure of a second UWB device according to an embodiment of the disclosure.

FIG. 18 illustrates a structure of a second UWB device according to an embodiment of the disclosure.

In an embodiment of FIG. 18, the second UWB device may correspond to the UWB device of FIGS. 1A and 1B, or include a UWB device, or may be an electronic device including a part of the UWB device.

In an embodiment of FIG. 18, second UWB device may be a UWB device serving as a controller/scanner or a controlee/scanner.

Referring to FIG. 18, the first UWB device may include a transceiver 1810, a controller 1820, and a storage 1830. In the disclosure, the controller may be defined as a circuit, an application specific integrated circuit, or at least one processor.

The transceiver 1810 may transmit/receive a signal to/from another entity. The transceiver 1810 may transmit/receive data to/from another device by using, for example, at least one NB channel and/or at least one UWB channel.

In an embodiment, the transceiver 1810 may include a first transceiver supporting the NB channel and a second transceiver supporting the UWB channel. In another embodiment, the transceiver 1820 may include a transceiver supporting at least one NB channel and at least one UWB channel.

The controller 1820 may control the overall operation of the electronic device according to the embodiment proposed in the disclosure. For example, the controller 1820 may control a signal flow between blocks to perform an operation according to the above-described flowchart. Specifically, the controller 1820 may, for example, control the operation of the second UWB device described with reference to FIGS. 1A, 1B, 2, 3A, 3B, 4A, 4B, 5, 6A, 6B, 6C, 6D, and 7 to 16 (e.g., the operation of the MAC entity of the second UWB device).

For example, the controller 1820 may receive at least one advertisement message providing information on the UWB channel used by the first UWB device through the NB channel.

For example, the controller 1820 may perform at least one operation for performing UWB ranging by using the UWB channel based on the advertisement message.

The storage 1830 may store at least one of information transmitted and received through the transceiver 1810 and information generated through the controller 1820. For example, the storage unit 1830 may store, for example, information and data (e.g., advertising information) necessary for the method described with reference to FIGS. 1A, 1B, 2, 3A, 3B, 4A, 4B, 5, 6A, 6B, 6C, 6D, and 7 to 16.

The embodiments described below may be applied together with, in addition to, or replacing some of the embodiments described above with reference to FIGS. 1A, 1B, 2, 3A, 3B, 4A, 4B, 5, 6A, 6B, 6C, 6D, and 7 to 18.

Embodiment of Multiple NB Channel Operation and Channel Hopping

As described above, one NB channel or a plurality of NB channels may be operated/supported together.

On the other hand, in a case where only one NB channel is operated (single NB channel operation case), in some cases, a situation in which smooth communication cannot be achieved may occur. For example, in a case where multiple devices use a single NB channel at the same time, smooth communication in the corresponding NB channel may not be achieved due to collision between signals of multiple devices. For another example, because the wireless communication environment of the single NB channel is not good, smooth communication in the corresponding NB channel may not be achieved.

Therefore, if necessary, a plurality of NB channels need to be operated together. In a case where a plurality of NB channels are operated, a channel hopping technique for communicating while hopping (or moving) channels may be used for smoother communication.

In a case where a plurality of NB channels are operated and a channel hopping technique is used/applied, the UWB device may perform a channel hopping operation based on a preconfigured hopping setting (e.g., a hopping sequence, a hopping period, and the number of a plurality of channels used for channel hopping). For example, in a case where a plurality of NB channels are operated and a channel hopping technique is used, the UWB device may hop a plurality of mirroring channels according to a preconfigured hopping setting and transmit an advertisement message/discovery message.

In this way, in a case where a plurality of NB channels are operated and a channel hopping technique is used, even if the corresponding NB channel is used by multiple devices at the same time, because a signal (message) is transmitted from an arbitrary channel according to the channel hopping operation, collision between signals is prevented and smooth communication is possible. In addition, in this case, even if the wireless communication environment of any particular channel is not good, because a signal (message) is transmitted while hopping/moving a plurality of channels according to the channel hopping operation, smooth communication is possible through another channel having a good wireless communication environment.

Embodiment of Transmission Offset for NB Channel

To avoid collisions between messages/frames within a slot (ranging slot), a transmission offset may be used. An example of a ranging round to which a transmission offset is applied may be as illustrated in FIG. 19.

Figure 19:
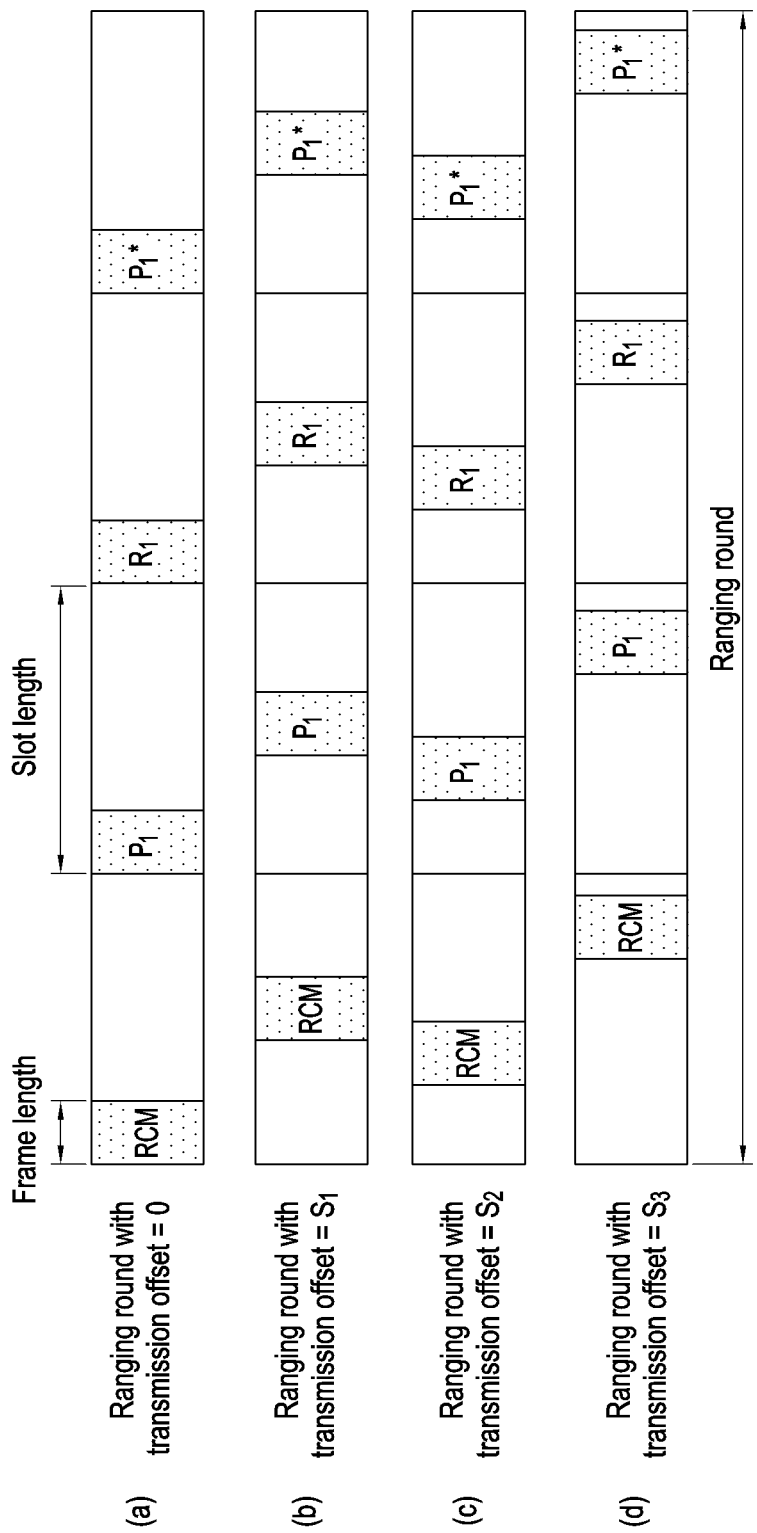
FIG. 19 illustrates a ranging round to which a transmission offset is applied according to an embodiment of the disclosure.

FIG. 19 illustrates a ranging round to which a transmission offset is applied according to an embodiment of the disclosure.

Part (a) of FIG. 19 illustrates a ranging round having a transmission offset of 0, part (b) of FIG. 19 illustrates a ranging round having a transmission offset of $S_1$, part (c) of FIG. 19 illustrates a ranging round having a transmission offset of $S_2$, and part (d) of FIG. 19 illustrates a ranging round having a transmission offset of $S_3$.

The embodiment of FIG. 19 may be an embodiment to which a transmission offset is applied, for example, when exchanging a ranging message in a UWB channel, but is not limited thereto, and may be applied, for example, to a message transmission in an NB channel. The description of the transmission offset may be referred to the description of IEEE 802.15.4z.

Referring to FIG. 19, the start time point (reference time point) of the transmission offset may be the start time of the ranging slot.

As an embodiment, the controller may determine a transmission offset and transmit information on the transmission offset to the controlee. For example, the controller may determine the transmission offset for the next ranging round (e.g., the ranging round of the next ranging block), and transmit information on the transmission offset to the controlee through a ranging control message or another message (e.g., ranging final message) of the current ranging round (e.g., the ranging round of the current ranging block). In this case, the corresponding transmission offset may be applied in the next ranging round.

As an embodiment, in the case of transmission of a message/packet within the same ranging round, the same transmission offset may be applied. That is, packets in each ranging slot within a corresponding ranging round may be transmitted by applying the same transmission offset.

On the other hand, even when a message/packet is transmitted from the NB channel, a transmission offset needs to be used, if necessary, in order to avoid collision between multiple devices. When a message is transmitted from the NB channel, an example of a slot to which a transmission offset is applied may be as illustrated in FIG. 20.

Figure 20:
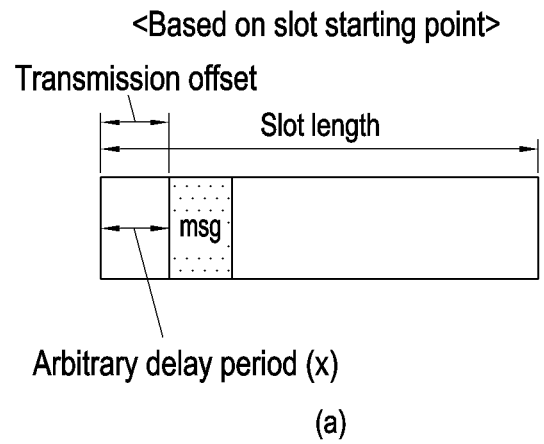
FIG. 20 illustrates a slot in a case where a transmission offset is applied in an NB channel according to an embodiment of the disclosure.
Figure 20:
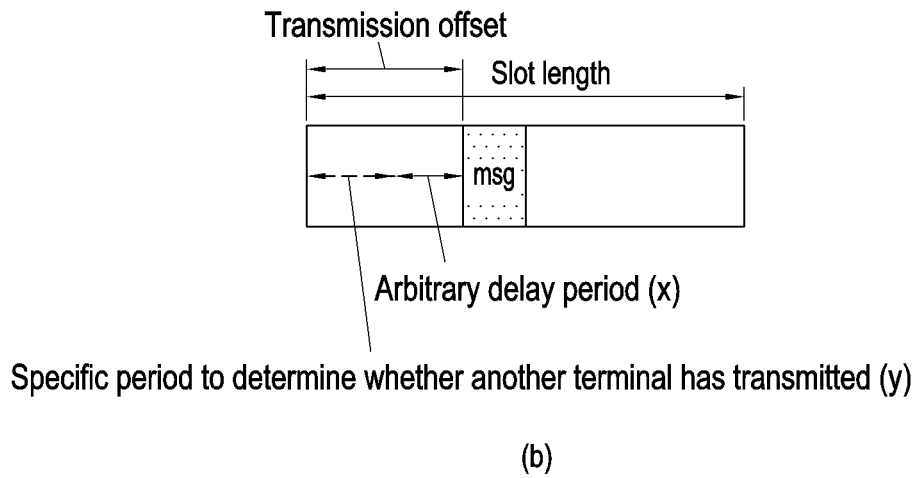
Figure 20:
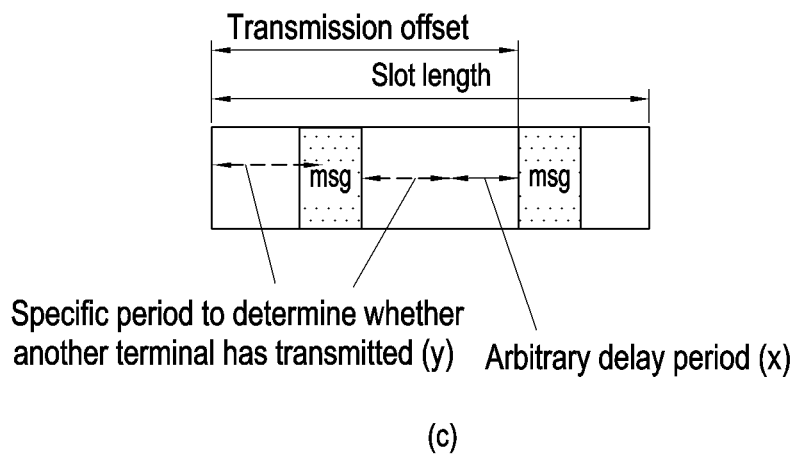

FIG. 20 illustrates a slot in a case where a transmission offset is applied in an NB channel according to an embodiment of the disclosure.

First Embodiment

The first embodiment may be an embodiment in which a UWB device transmitting a message through an NB channel determines a transmission offset without considering whether another terminal (e.g., another UWB device) transmits a message in a corresponding slot of the corresponding NB channel.

Part (a) of FIG. 20 may be an example of a slot to which a transmission offset determined according to the first embodiment is applied.

Referring to part (a) of FIG. 20, the UWB device may determine an arbitrary delay period x. As an embodiment, the UWB device may determine the arbitrary delay period x based on a specific time arbitrarily selected within a preset time range. As an embodiment, the time range used to determine the arbitrary delay period x may be the same time range preset for UWB devices that transmit a message through the NB channel.

The UWB device may determine the arbitrary delay period x as the transmission offset. As such, in the embodiment of part (a) of FIG. 20, because the start time point (reference time point) of the arbitrary delay period x corresponds to the start time point of the corresponding slot, the arbitrary delay period x may be determined as the transmission offset.

As an embodiment, the UWB device may include information on the transmission offset (or the arbitrary delay period x) in a message (e.g., an advertisement message/a discovery message) transmitted from the corresponding slot (e.g., a ranging slot in which the arbitrary delay period x or the transmission offset is determined) and transmit the information.

As an embodiment, in the associated slot(s), the same transmission offset may be applied. For example, in the next slot(s) (e.g., slot(s) in which advertisement/discovery messages following the current slot are transmitted) of the current slot (e.g., a slot in which the advertisement message/discovery message including information on the transmission offset (or the arbitrary delay period x) is transmitted), the same transmission offset may be applied.

Second Embodiment

The second embodiment may be an embodiment in which a UWB device transmitting a message through an NB channel determines a transmission offset considering whether another terminal (e.g., another UWB device) transmits a message in a corresponding slot of the corresponding NB channel.

Part (b) of FIG. 20 may be an example of a ranging slot to which a transmission offset determined according to the second embodiment is applied.

Referring to part (b) of FIG. 20, the UWB device may identify/figure out whether a message has been transmitted from another UWB device during a preset specific period y from the start time point of the corresponding slot. As an embodiment, the specific period y used to identify/figure out whether another UWB device has transmitted a message may be the same period preset for UWB devices that transmit a message through the NB channel.

In a case where no message is transmitted from another UWB device during a preset specific period y, the UWB device may determine the arbitrary delay period x. As an embodiment, the UWB device may determine the arbitrary delay period x based on a specific time arbitrarily selected within a preset time range. As an embodiment, the time range used to determine the arbitrary delay period x may be the same preset time range for UWB devices transmitting a message through the NB channel.

The UWB device may determine a period obtained by summing the preset specific period y and the arbitrary delay period x as the transmission offset.

As an embodiment, the UWB device may include information on the transmission offset (or the arbitrary delay period x) in a message transmitted from the corresponding slot (e.g., a slot in which the arbitrary delay period x or the transmission offset is determined) to the corresponding transmission offset and transmit the information. For example, the UWB device may include information on the transmission offset (or the arbitrary delay period x) in an advertisement message/discovery message transmitted from the corresponding slot through the NB channel.

As an embodiment, in the associated slot(s), the same transmission offset may be applied. For example, in the next slot(s) (e.g., slot(s) in which advertisement/discovery messages following the current slot are transmitted) of the current slot (e.g., a slot in which the advertisement message/discovery message including information on the transmission offset (or the arbitrary delay period x) is transmitted), the same transmission offset may be applied.

Part (c) of FIG. 20 may be another example of a ranging slot to which a transmission offset determined according to the second embodiment is applied.

Referring to part (c) of FIG. 20, the UWB device may identify/figure out whether a message has been transmitted from another UWB device during a preset specific period y from the start time point of the corresponding slot. As an embodiment, the specific period y used to identify/figure out whether another UWB device has transmitted a message may be the same period preset for UWB devices that transmit a message through the NB channel.

In a case where a message is transmitted from another UWB device during a preset specific period y (first period), the UWB device may re-identify/figure out whether a message has been transmitted from another UWB device during a preset specific period y' (second period) from the time point when the transmission of the corresponding message is completed. As an embodiment, as illustrated, the first period y and the second period y' may be the same period, but is not limited thereto. For example, depending on some embodiments, the second period y' may be a period shorter than the first period y.

In a case where no message is transmitted from another UWB device during a preset specific period y', the UWB device may determine the arbitrary delay period x. As an embodiment, the UWB device may determine the arbitrary delay period x based on a specific time arbitrarily selected within a preset time range. As an embodiment, the time range used to determine the arbitrary delay period x may be the same preset time range for UWB devices transmitting a message through the NB channel.

The UWB device may determine the transmission offset based on the preset specific period y (the first period), the preset specific period y' (the second period), transmission-related time information (e.g., transmission start time point, transmission end time point, and/or transmission period) of UWB messages transmitted from other UWB device(s), and/or the arbitrary delay period x. For example, the UWB device may determine a period obtained by summing the preset specific period y (the first period), the period from after the preset specific period y to the end of transmission of messages transmitted from other UWB device(s), the preset specific period y' (the second period), and the arbitrary delay period x as the transmission offset. For another example, the UWB device may determine a period obtained by summing the period from the start time point of the slot to the start time point of the transmission of UWB messages transmitted from other UWB device(s), the duration of transmission of UWB messages transmitted from other UWB device(s), the preset specific period y' (the second period), and the arbitrary delay period x as the transmission offset.

As an embodiment, the UWB device may include information on the transmission offset (or the arbitrary delay period x) in a message transmitted from the corresponding slot (e.g., a slot in which the arbitrary delay period x or the transmission offset is determined) to the corresponding transmission offset and transmit the information. For example, the UWB device may include information on the transmission offset (or the arbitrary delay period x) in an advertisement message/discovery message transmitted from the corresponding slot through the NB channel.

As an embodiment, in the associated slot(s), the same transmission offset may be applied. For example, in the next slot(s) (e.g., slot(s) in which advertisement/discovery messages following the current slot are transmitted) of the current slot (e.g., a slot in which the advertisement message/discovery message including information on the transmission offset (or the arbitrary delay period x) is transmitted), the same transmission offset may be applied.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a first ultra-wide band (UWB) device, the method comprising:
   generating an advertisement message including information on a UWB channel used by the first UWB device and information on a length of a ranging round included in a ranging block used for UWB communication; and
   broadcasting the advertisement message through a narrow band (NB) channel using an UWB communication protocol,
   wherein the UWB channel is one of candidate UWB channels allocated for UWB communication, and
   wherein a bandwidth of the NB channel is a narrower bandwidth than a bandwidth of the UWB channel.

2. The method of claim 1,
   wherein the advertisement message comprises at least one of:
   information on a number of ranging rounds or information for indicating an active round among all ranging rounds included in the ranging block.

3. The method of claim 1,
   wherein the broadcasting of the advertisement message comprises broadcasting the advertisement message through the NB channel at a start time point of each active round used in the UWB channel, and
   wherein the advertisement message comprises
   information for identifying whether active rounds included in the same ranging block belong to the same session.

4. The method of claim 1,
   wherein the broadcasting of the advertisement message comprises broadcasting the advertisement message through the NB channel in a selected slot of each ranging block or each active round used in the UWB channel, and
   wherein the advertisement message comprises at least one of:
   information indicating from which slot the advertisement message is transmitted, or
   information on a length of the slot.

5. The method of claim 1,
   wherein the broadcasting of the advertisement message comprises broadcasting the advertisement message through the NB channel every preset period in ranging blocks used in the UWB channel, and
   wherein the advertisement message comprises information on a period of a ranging block from which the advertisement message is transmitted.

6. The method of claim 1, further comprising:
   broadcasting an additional advertisement message through a NB channel;
   receiving a connection request message for connection setup from a second UWB device through the NB channel; and
   transmitting a connection confirmation message corresponding to the connection request message to the second UWB device through the NB channel.

7. A method of a second ultra-wide band (UWB) device, the method comprising:
   receiving, through a narrow band (NB) channel using an UWB communication protocol, an advertisement message including information on a UWB channel used by a first UWB device and information on a length of a ranging round included in a ranging block used for UWB communication; and
   performing at least one operation for performing UWB ranging by using the UWB channel based on the advertisement message,
   wherein the UWB channel is one of candidate UWB channels allocated for UWB communication, and
   wherein a bandwidth of the NB channel is a narrower bandwidth than a bandwidth of the UWB channel.

8. The method of claim 7,
   wherein the advertisement message comprises at least one of:
   information on a number of ranging rounds or information for indicating an active round among all ranging rounds included in the ranging block.

9. The method of claim 7,
   wherein the advertisement message is broadcasted by the first UWB at a start time point of each active round used in the UWB channel through the NB channel, and
   wherein the advertisement message comprises
   information for identifying whether active rounds included in the same ranging block belong to the same session.

10. The method of claim 7,
    wherein the advertisement message is broadcasted by the first UWB in a selected slot of each ranging block or each active round used in the UWB channel through the NB channel, and
    wherein the advertisement message comprises at least one of:
    information indicating from which slot the advertisement message is transmitted, or
    information on a length of the slot.

11. The method of claim 7,
    wherein the advertisement message is broadcasted by the first UWB every preset period in ranging blocks used in the UWB channel through the NB channel, and
    wherein the advertisement message comprises information on a period of a ranging block from which the advertisement message is transmitted.

12. The method of claim 7, further comprising:
    receiving an additional advertisement message through a NB channel;

transmitting a connection request message for connection setup to the first UWB device through the NB channel; and receiving a connection confirmation message corresponding to the connection request message from the first UWB device through the NB channel.

13. The method of claim 7, wherein performing at least one operation for performing the UWB ranging comprises:

performing an operation for participating in a first UWB ranging session controlled by the first UWB device; or performing an operation for configuring a second UWB ranging session controlled by the second UWB device, wherein the first UWB ranging session and the second UWB ranging session use the UWB channel.

14. A first ultra-wide band (UWB) device comprising:

at least one transceiver; and a controller connected to the at least one transceiver, wherein the controller is configured to:

generate an advertisement message including information on a UWB channel used by the first UWB device and information on a length of a ranging round included in a ranging block used for UWB communication, and broadcast the advertisement message through a narrow band (NB) channel using an UWB communication protocol, wherein the UWB channel is one of candidate UWB channels allocated for UWB communication, and wherein a bandwidth of the NB channel is a narrower bandwidth than a bandwidth of the UWB channel.

15. The first UWB device of claim 14, wherein the at least one transceiver comprises:

a first transceiver supporting the NB channel; and a second transceiver supporting the UWB channel.

16. The first UWB device of claim 14, wherein the advertisement message comprises at least one of information on a number of ranging rounds or information for indicating an active round among all ranging rounds included in the ranging block.

17. The first UWB device of claim 14, wherein the controller is further configured to broadcast the advertisement message through the NB channel at a start time point of each active round used in the UWB channel, and wherein the advertisement message comprises information for identifying whether active rounds included in the same ranging block belong to the same session.

18. A second ultra-wide band (UWB) device comprising:

at least one transceiver; and a controller connected to the at least one transceiver, wherein the controller is configured to:

receive, through a narrow band (NB) channel using an UWB communication protocol, an advertisement message including information on a UWB channel used by a first UWB device and information on a length of a ranging round included in a ranging block used for UWB communication, and perform at least one operation for performing UWB ranging by using the UWB channel based on the advertisement message, wherein the UWB channel is one of candidate UWB channels allocated for UWB communication, and wherein a bandwidth of the NB channel is a narrower bandwidth than a bandwidth of the UWB channel.

19. The second UWB device of claim 18, wherein the at least one transceiver comprises:

a first transceiver supporting the NB channel; and a second transceiver supporting the UWB channel.

20. The second UWB device of claim 18, wherein the advertisement message comprises at least one of information on a number of ranging rounds, or information for indicating an active round among all ranging rounds included in the ranging block.

* * * * *